US008667117B2

(12) United States Patent
Wang et al.

(10) Patent No.: US 8,667,117 B2
(45) Date of Patent: Mar. 4, 2014

(54) SEARCH RANGER SYSTEM AND DOUBLE-FUNNEL MODEL FOR SEARCH SPAM ANALYSES AND BROWSER PROTECTION

(75) Inventors: Yi-Min Wang, Bellevue, WA (US); Ming Ma, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1379 days.

(21) Appl. No.: 11/756,602

(22) Filed: May 31, 2007

(65) Prior Publication Data

US 2008/0301116 A1 Dec. 4, 2008

(51) Int. Cl.
G06F 15/173 (2006.01)
G06F 15/16 (2006.01)
G06F 7/00 (2006.01)
G06F 17/30 (2006.01)

(52) U.S. Cl.
USPC ........... 709/224; 709/206; 709/223; 707/705; 707/722; 707/723; 707/735

(58) Field of Classification Search
USPC .............. 709/224, 229, 204–207, 223; 726/1, 726/22–25; 707/3, 6, 102, 705, 722, 723, 707/735
See application file for complete search history.

(56) References Cited

U.S. PATENT DOCUMENTS

| | | | |
|---|---|---|---|
| 5,892,919 A | 4/1999 | Nielsen | |
| 6,092,100 A | 7/2000 | Berstis et al. | |
| 6,195,698 B1 | 2/2001 | Lillibridge et al. | |
| 6,393,465 B2 | 5/2002 | Leeds | |
| 7,346,604 B1 | 3/2008 | Bharat et al. | |
| 7,376,752 B1 | 5/2008 | Chudnovsky et al. | |
| 7,421,498 B2 | 9/2008 | Packer | |
| 7,424,510 B2 | 9/2008 | Gross et al. | |
| 7,533,092 B2 * | 5/2009 | Berkhin et al. | ........................ 1/1 |
| 7,657,507 B2 | 2/2010 | Shi et al. | |

(Continued)

FOREIGN PATENT DOCUMENTS

WO    WO2006036170 A1    4/2006

OTHER PUBLICATIONS

"MSR Strider URL Tracer", retrieved on Nov. 25, 2009 at <<http://research.microsoft.com/en-us/downloads/7c576d6e-ab43-4a7c-a454-df189cf6356b/>>, Microsoft Research, Microsoft, 1 page.
"Strider URL Tracer with Typo-Patrol" retrieved on Nov. 25, 2009 at <<http://research.microsoft.com/en-us/um/redmond/projects/strider/urltracer/>>, Microsoft Research, Microsoft, 6 pages.

(Continued)

*Primary Examiner* — Tae Kim
(74) *Attorney, Agent, or Firm* — Holly Nguyen; Carole Boelitz; Micky Minhas

(57) ABSTRACT

An exemplary method for protecting web browsers from spam includes providing a multi-layer model that includes a doorway layer, a redirection domain layer, an aggregator layer, a syndicator layer and an advertiser layer; identifying domains as being associated with at least one of the layers; and, based at least in part on the identifying, taking one or more corrective actions to protect web browsers from search spam. An exemplary method for identifying a bottleneck layer in a multi-layer spam model includes providing a multi-layer spam model, collecting spam advertisements, associating a block of IP addresses with the collected spam advertisements and identifying a bottleneck layer based on the block of IP addresses. Other methods, systems, etc., are also disclosed.

18 Claims, 10 Drawing Sheets

(56) References Cited

U.S. PATENT DOCUMENTS

| | | | |
|---|---|---|---|
| 7,660,792 B2* | 2/2010 | Brewer et al. | 726/22 |
| 7,676,520 B2* | 3/2010 | Liu et al. | 707/748 |
| 7,693,833 B2* | 4/2010 | Nagle | 705/10 |
| 7,716,297 B1* | 5/2010 | Wittel et al. | 709/206 |
| 7,743,045 B2* | 6/2010 | Guha | 707/706 |
| 7,756,987 B2* | 7/2010 | Wang et al. | 709/229 |
| 8,452,746 B2* | 5/2013 | Guha | 707/706 |
| 2002/0099693 A1 | 7/2002 | Kofsky | |
| 2004/0010710 A1 | 1/2004 | Hsu et al. | |
| 2004/0028227 A1 | 2/2004 | Yu | |
| 2004/0030741 A1 | 2/2004 | Wolton et al. | |
| 2004/0220903 A1 | 11/2004 | Shah et al. | |
| 2005/0097107 A1 | 5/2005 | Burt | |
| 2005/0144067 A1* | 6/2005 | Farahat et al. | 705/14 |
| 2005/0251496 A1* | 11/2005 | DeCoste et al. | 707/1 |
| 2005/0262210 A1 | 11/2005 | Yu | |
| 2006/0004748 A1* | 1/2006 | Ramarathnam et al. | 707/6 |
| 2006/0036598 A1 | 2/2006 | Wu | |
| 2006/0036746 A1 | 2/2006 | Davis | |
| 2006/0069667 A1* | 3/2006 | Manasse et al. | 707/2 |
| 2006/0069697 A1* | 3/2006 | Shraim et al. | 707/102 |
| 2006/0095416 A1* | 5/2006 | Barkhin et al. | 707/3 |
| 2006/0184500 A1* | 8/2006 | Najork et al. | 707/1 |
| 2006/0200556 A1* | 9/2006 | Brave et al. | 709/224 |
| 2006/0212925 A1* | 9/2006 | Shull et al. | 726/1 |
| 2006/0248072 A1 | 11/2006 | Brewer et al. | |
| 2006/0253578 A1 | 11/2006 | Dixon et al. | |
| 2006/0253579 A1 | 11/2006 | Dixon et al. | |
| 2006/0288078 A1 | 12/2006 | Mashimo | |
| 2007/0055642 A1* | 3/2007 | Kim et al. | 707/1 |
| 2007/0078939 A1* | 4/2007 | Kallen | 709/207 |
| 2007/0179987 A1 | 8/2007 | Lim | |
| 2007/0180356 A1* | 8/2007 | Sun | 715/511 |
| 2007/0239701 A1* | 10/2007 | Blackman et al. | 707/5 |
| 2008/0065632 A1 | 3/2008 | Nam et al. | |
| 2008/0154847 A1* | 6/2008 | Chellapilla et al. | 707/3 |
| 2008/0250159 A1* | 10/2008 | Wang et al. | 709/239 |
| 2009/0300770 A1 | 12/2009 | Rowney et al. | |

OTHER PUBLICATIONS

Benczur, et al., "SpamRank-Fully Automatic Link Spam Detection", available as early as Dec. 26, 2006, at <<http://airweb.cse.lehigh.edu/2005/benczur.pdf>>, pp. 1-14.

"Firefox 1.5.0.10", retrieved on Feb. 4, 2009 at <<http://mozilla.com/en-US/firefox/releases/1.4.0.10.html>>, Mozilla, Feb. 23, 2007, 31 pages.

Metaxas, et al., "Web Spam, Propaganda and Trust", available as early as Dec. 26, 2006, at <<http://cs.wellesley.edu/~pmetaxas/TR28-2004/spamPropTrust.pdf>>, pp. 1-9.

Palant, "Adblock Plus ver. 0.7.2.4", retrieved on Feb. 4, 2009 at <<http://adblockplus.org.en/>>, Firefox Addon, Jan. 5, 2007, 2 pages.

Wang, et al., "Strider Typo-Patrol: Discovery and Analysis of Systematic Typo-Squatting", SRUTI 2006: 2nd Workshop on Steps to Reducing Unwanted Traffic on the Internet, USENIX Association, Jul. 2006, pp. 31-36.

"Web of Trust ver. 20070226", retrieved on Feb. 4, 2009 at <<https://addons.mozilla.org/en-US/firefox/addons/versions/3456>>, Against Intuition, Firefox Addon, Feb. 25, 2007, 14 pages.

Wu, et al., "Propagating Trust and Distrust to Demote Web Spam", available as early as Dec. 26, 2006, at <<http://citeseer.ist.psu.edu/cache/papers/cs2/675/http:zSzzSzwww.cse.lehigh.eduzSz~brianzSzpubszSz2006zSzMTWzSzpropagating-trust.pdf/propagating-trust-and-distrust.pdf>>, Lehigh University, pp. 1-9.

"Yadis", retrieved on Feb. 4, 2009 at <<http://en.wikipedia.org/w/index.php?title=Yadis&diff=100489763&oldi . . . >>, Wikipedia, Jan. 13, 2007, 4 pages.

Office Action for U.S. Appl. No. 12/966,120, mailed on Nov. 29, 2011, Yi-Min Wang, "Search Spam Analysis and Detection", 11 pgs.

Final Office Action for U.S. Appl. No. 12/966,120, mailed on May 8, 2012, Yi-Min Wang et al., "Search Spam Analysis and Detection", 13 pgs.

Office action for U.S. Appl. No. 12/966,120, mailed on Aug. 7, 2013, Wang, et al., "Search Spam Analysis and Detection", 17 pages.

Office action for U.S. Appl. No. 12/966,120, mailed on Oct. 24, 2013, Wang, et al., "Search Spam Analysis and Detection", 18 pages.

* cited by examiner

US 8,667,117 B2

SEARCH RANGER SYSTEM AND DOUBLE-FUNNEL MODEL FOR SEARCH SPAM ANALYSES AND BROWSER PROTECTION

RELATED APPLICATIONS

This application is related to co-pending U.S. patent application Ser. No. 11/696,580, filed Apr. 4, 2007, entitled "Cybersquatter Patrol", which is incorporated by reference herein.

BACKGROUND

Search spammers (or web spammers) spam web users via techniques that cause search engines to rank their links, undeservedly, amongst top search results. Search spammers typically target commerce search queries that include keywords of well-known brands, high demand consumer products, etc. For example, spam targeted keywords include generic terms such as handbag and ringtone as well as trademarks such as GUCCI® and VIAGRA®. As most search spammers spam for profit, certain consumer product sellers bear a disproportionate burden of illicit search spam activity. Further, search spam places a burden on the web. Search spam traffic can be significant and search spam decreases search efficiency. In addition, search spammers divert advertising money from legitimate advertising service providers. Search spammers free ride on the goodwill of web and act counter to the web's intended experience.

SUMMARY

An exemplary method for protecting web browsers from spam includes providing a multi-layer model that includes a doorway layer, a redirection domain layer, an aggregator layer, a syndicator layer and an advertiser layer; identifying domains as being associated with at least one of the layers; and, based at least in part on the identifying, taking one or more corrective actions to protect web browsers from search spam. An exemplary method for identifying a bottleneck layer in a multi-layer spam model includes providing a multi-layer spam model, collecting spam advertisements, associating a block of IP addresses with the collected spam advertisements and identifying a bottleneck layer based on the block of IP addresses. Other methods, systems, etc., are also disclosed.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

As mentioned in the background section, the problem of search spam is not new. Search spam has traditionally been modeled as an information retrieval and relevance ranking problem. For example, conventional search engine ranking techniques that rely on analysis of content of each web page and hyperlinking relationships between pages simply hope that spam pages will naturally have lower ranks and thus appear in search results after all non-spam pages.

However, search spammers have successfully attacked the relevance-based, anti-spam solutions by providing both bogus content and bogus links. To provide bogus content, some spammers use crawler-browser cloaking by serving a non-spam page designed to gain a high relevance score to crawlers. A high relevance score translates into a high search results ranking and likelihood of selection by a user. However, when a user selects the high ranking search spam link, the spam link displays spam content designed to maximize the spammer's potential profit. To provide bogus links, spammers often create "link farms" (i.e., large number of websites artificially linking to each other), insert hidden links into cloned websites and perform comment spamming by injecting spam links into the comment fields of publicly accessible "forums" (e.g., blogs, bulletin boards, message boards, guest books, web journals, diaries, galleries, archives, etc. that can be abused by web spammers to promote spam URLs).

Figure 1:
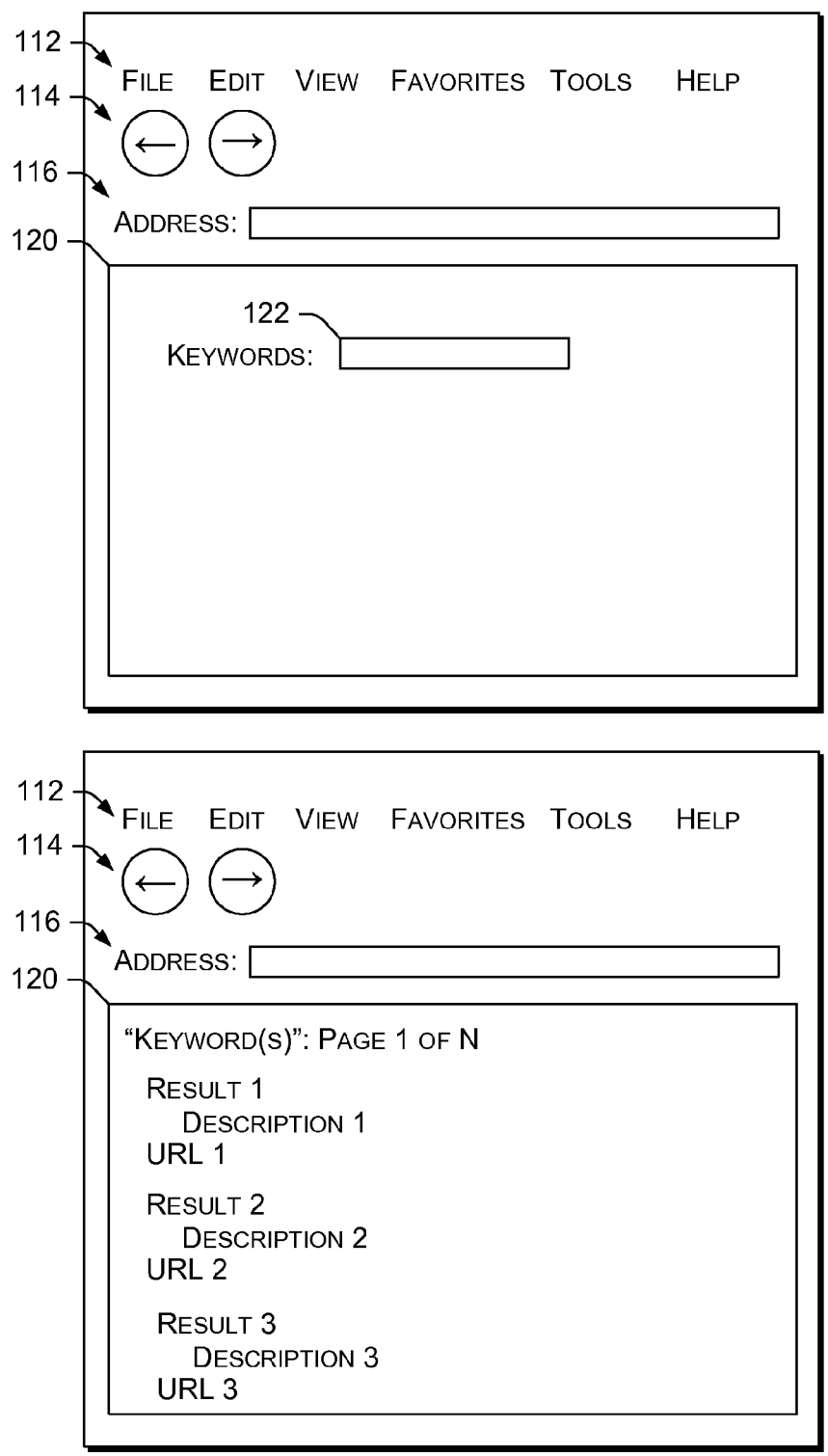
FIG. 1 is a diagram of a graphical user interface (GUI) of a browser application for performing searches that use one or more search engines.

FIG. 1 shows a search GUI 100 that includes features associated with most search engines. For example, the GUI 100 includes various command words 112, command graphics 114, an address window 116, a search results or content frame 120 and a keyword window 112. In a conventional search operation, a user enters one or more keywords in the keyword window 122 and, in response, search results are displayed in the search results frame 120. The search results are ranked by one or more ranking algorithms and usually displayed from highest to lowest ranking result. Search results usually include a short descriptive term (e.g., Result 1) followed by a short description (e.g., Description 1) and a URL (e.g., URL 1). The top ranking search result should match the user's intent, however, prevalent use of search spam techniques by search spammers make such a result less likely.

With respect to search spam, after a user instructs the browser application to visit a URL (referred to as the primary URL), the browser application may visit other URLs (referred to as secondary URLs) automatically. The secondary URLs may contribute to inline contents (e.g., GOOGLE® AdSense ads) on the primary page, or may replace the primary page entirely (i.e., replace the URL in the address bar). These two types of secondary URLs redirection techniques are discussed in more detail below with respect to redirection spam.

Figure 2:
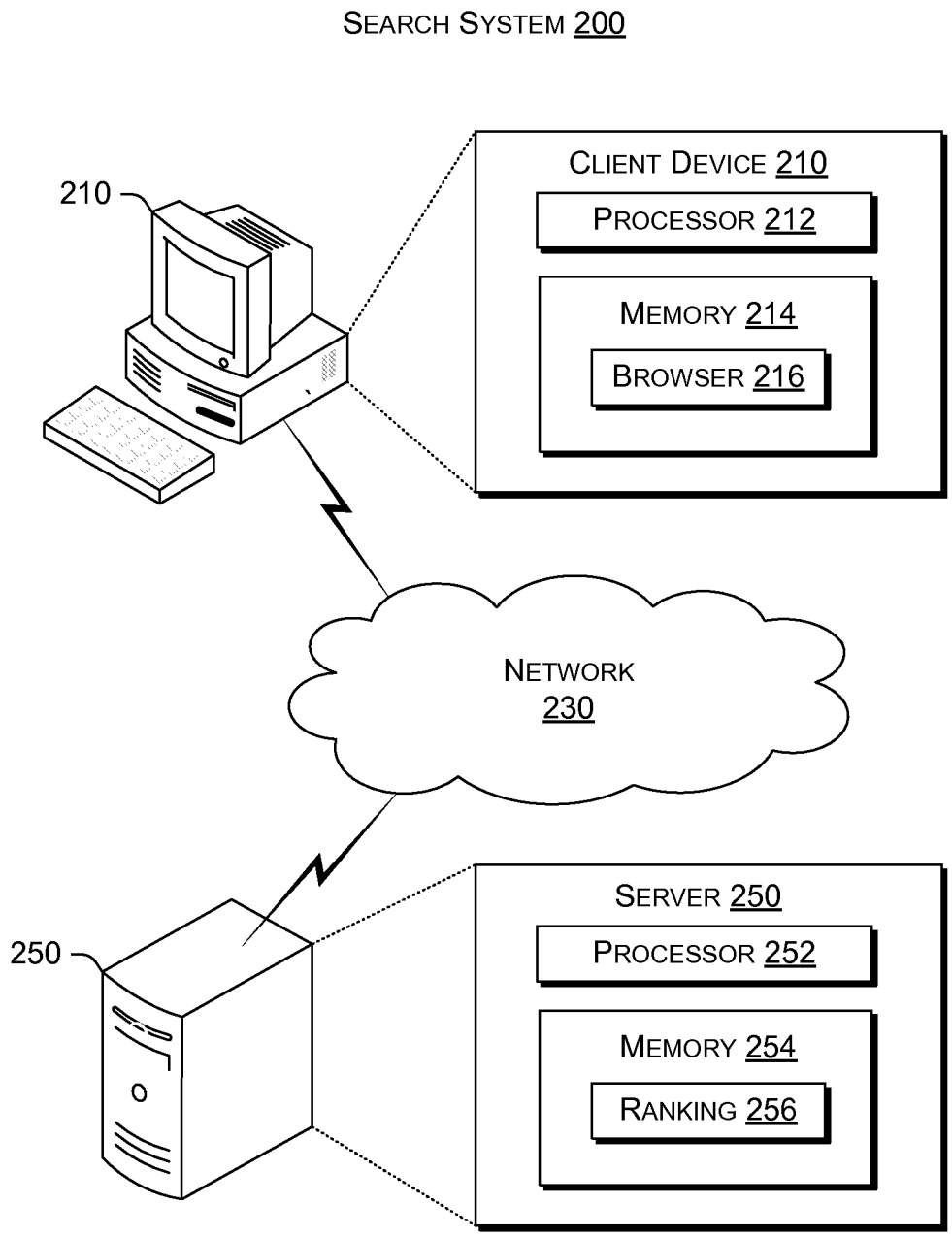
FIG. 2 is a diagram of various components of a networked based search system.

FIG. 2 shows a search system 200 that includes a client device 210 and a server 250 in communication via a network 230. The client device 210 includes a processor 212 and memory 214 that includes processor-executable instructions for performing web searches 216. The server 250 includes a processor 252 and memory 254 that includes processor-executable instructions for ranking web pages according to one or more search criteria (e.g., one or more keywords).

Various exemplary techniques described herein take an approach to the search spam problem that differs from the conventional content-based approach. As described below, the large-scale search spam problem is modeled as defending against correlated attacks on search rankings across multiple keywords. Given this model, an exemplary method uses an autonomic anti-spam approach based on self-monitoring and self-protection. For example, such a method includes monitoring and correlating search results of spammer-targeted keywords (STKs) to detect large-scale spam attacks, especially those attacks that have successfully bypassed conventional anti-spam solutions. In response, a search engine may initiate self-protection through (i) targeted patrol of spam-heavy domains, (ii) targeted hunting at the sources of successful spam, and/or (iii) strengthening of specific weakness in the ranking algorithms.

An exemplary system, referred to as the Search Ranger (SR) system, implements techniques to identify and defend against correlated attacks. In an example, such a system defends against a class of search spam known as redirection spam. An evaluation of this system using actual search results demonstrates successful detection of spam patterns, which, in turn, may be used to eliminate a significant amount of search spam for all three major search engines.

While conventional approaches are information retrieval-centric and apply content analysis to all crawler-indexed pages, various exemplary techniques described herein rely on a security problem model and apply traffic analysis to true user-seen pages presented by search results of spammer-targeted commerce queries. By analogy to the physical world, no attempt is made to separate criminals from the innocent majority by lining up billions of people and trying to identify how today's criminals typically dress themselves. Instead, intelligence gathering identifies problem neighborhoods and places those who are particularly active in those neighborhoods under surveillance. Once under surveillance, the perpetrators may be captured as they conduct criminal acts in the crime scene. Further, the perpetrators may be interrogated to collect more information about their networks. With a network map, upstream and downstream miscreants involved in business transactions with the perpetrators can be hunted down.

An exemplary method may optionally operate autonomously. An autonomic approach self-monitors search results to detect large-scale spammers (e.g., those that have successfully defeated one or more conventional anti-spam solutions) and then fights back by addressing specific weakness in one or more ranking algorithms. Such a method may also perform targeted spam patrol and/or spam hunting for self-protection.

An exemplary method can patrol a group of search results where the group has a high likelihood of including high density of spam links. Such a method tries to detect anomalies of correlations that indicate the presence of large-scale spammers that are occupying a large number of search results. Based on correlation information, such a method can strengthen one or more search ranking algorithms to broadly defend against similar attacks in the future. A method may perform targeted hunting of related spam pages to clean up existing damages.

The aforementioned Search Ranger (SR) system can perform autonomously against a class of search spam known as redirection spam. Redirection spam refers to those spam pages that can be characterized by the third-party domains they generate redirection traffic to. Redirection spam plagues all three major search engines because it often involves large-scale attacks and because it typically uses cloaking techniques to fool content-based analysis (e.g., per conventional approaches).

The use of redirection is becoming essential to a big part of the search spam business that includes (i) traffic-affiliate spammers that participate directly in affiliate programs of merchant sites "affiliate model") and (ii) syndication-based spammers that participate in pay-per-click schemes, advertising syndication programs and display ads-portal pages "syndication model").

In the affiliate model, the need for spam pages to redirect to their target merchant sites is clear. In the syndication model, many large-scale spammers have moved to the practice of setting up "throw-away" doorway pages on legitimate websites to avoid exposing their own domains to blacklisting by search engines. With respect to such aversion tactics, consider free blog-hosting sites such as blogspot.com and free web-hosting sites such as hometown.aol.com, which are popular among syndication model spammers. Since spammers do not own these exploited servers, the spammers typically use client-side scripts to redirect browsers to fetch ads from redirection domains that the spammers own or otherwise control, as opposed to exploit.

The Search Ranger (SR) system combats redirection spam by monitoring spammer-targeted keywords and identifying major doorway domains and redirection domains that have successfully spammed those keywords. The SR system then directs machine resources accordingly to hunt for more spam pages that are associated with these successful spammers; noting that successful spammers are very likely have spammed other keywords as well. The SR system also provides concrete feedback on the weakness of the current content- and link-based ranking algorithms to help strengthening these algorithms against the influence of spam.

The SR system is explained below in more detail preceded by a description of a few actual redirection-spam examples for context. More specifically, the overall architecture of the SR system is described with particular attention to self-monitoring and self-protection components. An evaluation follows to assess effectiveness of the SR system by demonstrating it can actually improve the search quality of all three major search engines.

Search spam will always remain an arms race as spammers continuously try to reverse-engineer search engine ranking algorithms to find weaknesses that they can exploit. Various exemplary techniques target two invariants that characterize large-scale spammers: (i) spammers care mainly about commerce-related queries that they can monetize (noting that other spamming may also occur such as political spamming) and (ii) spammers want to spam many search results of those queries. The SR system can limit spammer success.

Various exemplary methods include similarity-based grouping, to monitor search results of spammer-targeted keywords, and implementing techniques to defend against identified large-scale spammers, especially spammers that redirect their spam pages to third-party final destinations.

Syndication-Based Spammers

A legitimate syndication business is typically composed of three layers: (i) the publishers that operate high-quality websites to attract traffic; (ii) the advertisers that pay for their ads to appear on those sites; and (iii) the syndicator that provides the infrastructure to connect them. A spam-heavy syndication program typically has more layers in order to insulate legitimate advertisers from the spam pages where their ads appear: the spammers play the role of publishers by creating low-quality doorway pages that send visiting browsers to their ads-serving redirection domains. When a spam ad is clicked, the click-through traffic usually goes to an anonymous aggregator domain, which funnels such traffic from a large number of spam pages to a handful of syndicators that are responsible for the final redirection to the target websites owned by the advertisers. Ultimately, it is the advertisers that pay for the click-through traffic and fund the search-spam industry.

Two examples of successful spam pages provide for a more concrete understanding of syndication-based spam. The following spam URL appeared in a top-10 GOOGLE® search engine search results for the keywords "discount chanel handbag": http://hometown.aol.com/m1stnah/chanel-handbag-s.html. This URL operated as a doorway to redirect a browser to a well-known redirection domain topsearch10.com. Upon clicking an http://www.shopping.com ad, click-through traffic was first directed to an aggregator domain (66.230.173.28), which, in turn, redirected to a syndicator domain looksmart.com, which, in turn, redirected to the advertiser domain shopping.com.

In another example, a spam URL from a U.S. government domain appeared in the top-10 YAHOO!® search results for the keywords "verizon ringtone": http://www.usaid.gov/cgi-bin/goodbye?http://catalog-online.kzn.ru/free/verizon-ringtones/. This spam took advantage of the Universal Redirector provided by usaid.gov to redirect to the doorway page at http://catalog-onine.kzn.ru/free/verizon-ringtones/, which in turn redirected to the well-known redirection domain payseefeed.net. Upon clicking an http://usa.funmobile.com ad, a browser was sent through the following redirection chain: an aggregator domain (66.230.182.178), a syndicator domain findwhat.com, and the advertiser domain funmobile.com.

Traffic-Affiliate Spammers

Some merchant websites provide affiliate programs that pay for traffic drawn to their sites. Many spammers abuse such programs by creating and promoting doorway pages that redirect to these merchant sites. There is a major difference between traffic-affiliate spam and syndication-based spam: while the latter displays a list of ads and requires an additional ad-click to initiate the redirection chain leading to the advertiser's website, the former directly brings the browser to the merchant site. As a result, while the final destination for clicking on a syndication-based doorway is often a spammer-operated ads-serving domain, it is the intermediate redirection domains in the traffic-affiliate scenario that are responsible for the spam.

Two examples of affiliate-based spam pages provide for a more concrete understanding. The following spam URL appeared in the top-10 LIVE SEARCH® results for the keywords "cheap ticket": http://hometown.aol.com/kliktop/Cheap-TICKET.html. Clicking on this doorway link generated a redirection chain through two intermediate domains travelavailable.com and bfast.com and that eventually entered expedia.com with a URL that includes an affiliate identification code (affiliate ID): "affcid=41591555". Another related spam doorway URL http://hometown.aol.com/kliktop/Asia-TRAVEL.html exhibited the same redirection chain.

As a second example, several adult-content websites have affiliate programs and a handful of spammers appear to participate in multiple such programs by redirecting doorway traffic through an intermediate "rotator" domain that rotates the final destination among the spammers. These spammers use a "keyword blanket" that contains a large number of unrelated keywords to allow their adult links to appear in search results of non-adult queries that include less common combinations of keywords. Examples include http://www.booblepoo.org/ (which redirected to http://rotator.leckilecki.com/Esc.php, which in turn redirected to http://www.horny-matches.com/65ec65fd/3/), and http://www.teen-dating.biz/ (which rotates through http://www.rotator.chippie.biz/My_Rotator.php to land on http://www.hornymatches.com/21d80ed5/cf774807/ or one of a few other sites). The numbers in the two final-destination URLs appear to encode the affiliate IDs.

Figure 3:
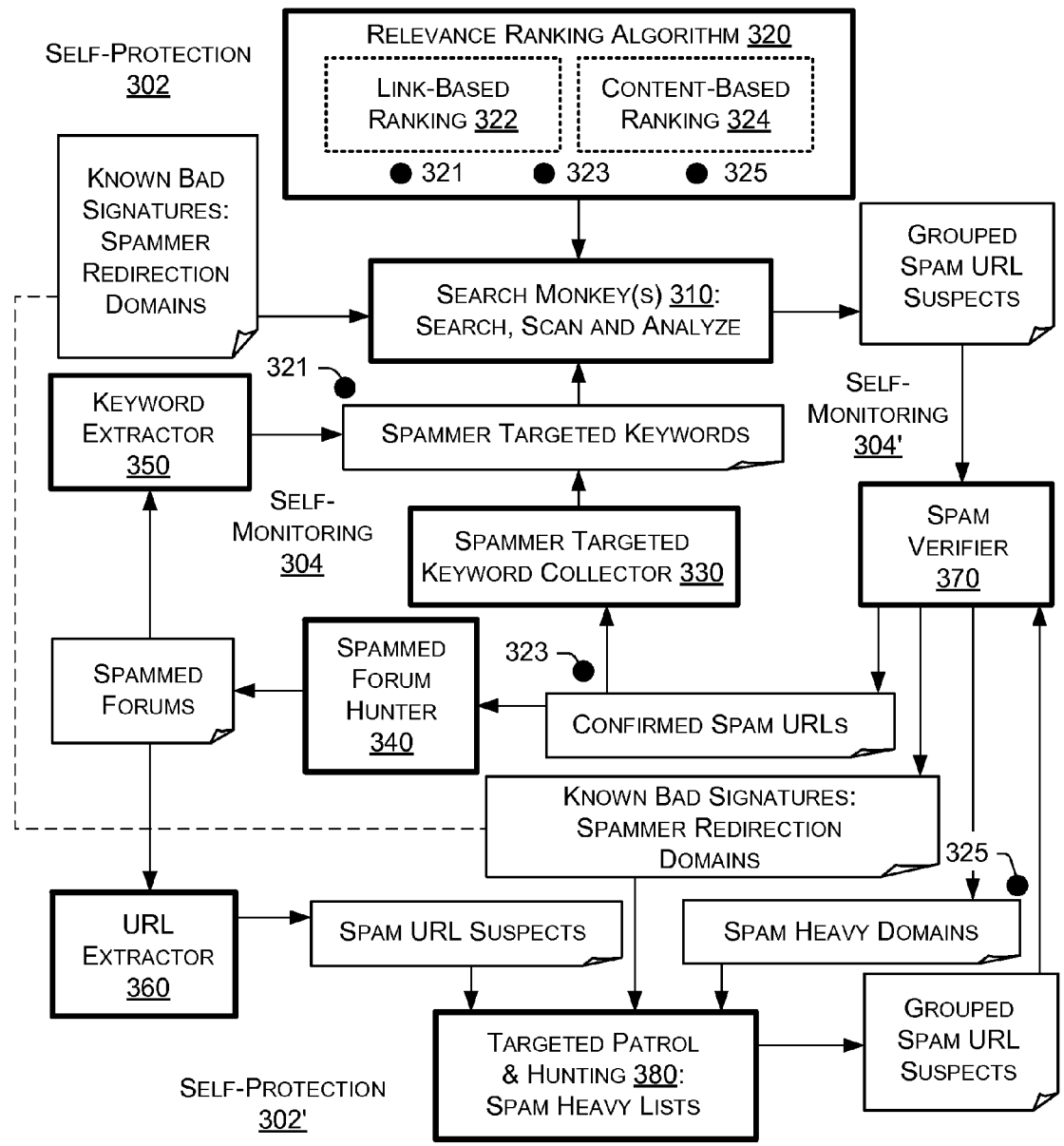
FIG. 3 is a diagram of an exemplary architecture that includes self-monitoring and self-protection components.
Figure 4:
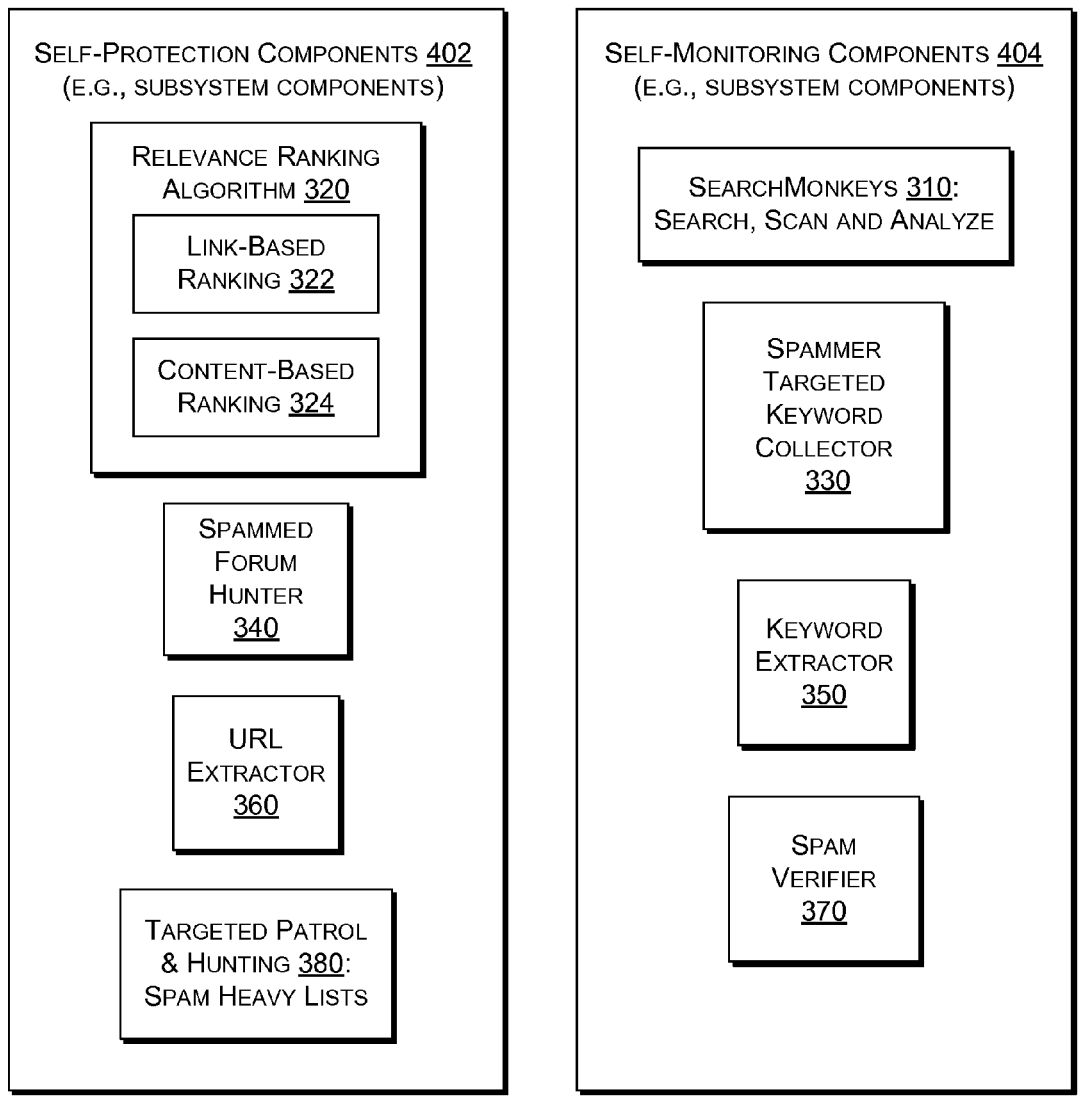
FIG. 4 is a diagram of various exemplary self-protection components and self-monitoring components.

FIG. 3 shows an exemplary architecture 300 that includes self-protection processes 302, 302' and self-monitoring processes 304, 304'. The self-protection processes 302, 302' include use of components such as a relevance ranking algorithm 320, a spammed forum hunter 340, a URL extractor 360 and a targeted patrol and hunting component 380 for spam heavy URL lists. The self-monitoring processes 304, 304' include use of components such as a search monkey(s) component 310, a spammer targeted keyword collector 330, a keyword extractor 350, and a spam verifier 370. These components are also shown in FIG. 4 aside from the architecture 300 of FIG. 3, to indicate that an exemplary system may implement self-protection using one or more of the self-protection components 320, 340, 360 and 380 and/or implement self-monitoring using one or more of the self-monitoring components 310, 330, 350 and 370.

An exemplary system can include various components of the architecture 300. Such components may be organized to form one or more sub-systems, for example, one or more of the self-protection components may form a self-protection subsystem while one or more of the self-monitoring components may form a self-monitoring subsystem.

While some search ranking algorithms can use techniques to proactively demote spam pages as a first line of defense, spammers can uncover these techniques. Once uncovered, a spammer may exploit or bypass such safe-guards to promote its spam pages. As explained herein, an exemplary reactive system (e.g., arranged according to the architecture 300) can provide a last line of defense and complement search ranking algorithm demotion techniques. For example, a reactive, last line of defense approach can complement an existing first line of defense by providing concrete and systematic evidence on the weakness of search ranking algorithms that have been exploited by spammers. As described herein, an exemplary system uses redirection-based spam detection in an autonomic anti-spam approach.

In FIG. 3, the relevance ranking algorithm 320 associated with self-protection further includes a link-based ranking component 322 and a content-based ranking component 324. These components typically belong to one or more relevance ranking algorithms that are separate from, or outside of, an exemplary system (e.g., SR system) yet the components 322 and/or 324 may receive information as indicated by the filled circles 321 (spammer targeted keywords), 323 (confirmed spam URLs) and/or 325 (spam heavy domains). Operational characteristics of the architecture 300 may be explained using any of a variety of steps. For example, the architecture 300 may commence with the search monkey(s) component 310 scanning search results of spammer-targeted keywords (e.g., information 321) and, in turn, providing a prioritized list of groups of spam-URL suspects to the spam verifier component 370, which attempts to gather evidence of common spamming activities to confirm spam status of the suspect URLs.

The spammed forum hunter component 340 can receive confirmed spam URLs (e.g., information 323) output by the spam verifier component 370 and use these URLs to perform a backward discovery of their supporting forums from which additional spammer-targeted keywords may be extracted by the keyword extractor component 350, for example, to update one or more self-monitoring components. According to the example of FIG. 3, new spam-URL suspects can be extracted by the URL extractor component 360 and provided to the targeted patrol and hunting component 380.

Various terms are used in explaining various examples of operation of the exemplary architecture 300. These terms include "link-query" and "site-query":

(a) Link-query: a query of "link:http://foo.com/bar" returns a list of pages that contain links to http://foo.com/bar; and (b) Site-query: a query of "site:foo.com bar" returns a list of pages hosted on foo.com that contain the keyword "bar".

As already mentioned, FIG. 4 shows self-protection components 402 and self-monitoring components 404. The self-protection components 402 may be organized to form a self-protection subsystem and the self-monitoring components 404 may be organized to form a self-monitoring subsystem. For example, an exemplary system can include a self-protection subsystem and a self-monitoring subsystem.

The self-monitoring components 402 include the spammer targeted keyword collector 330. With rare exception, large-scale spammers are in the business to make money, so they are typically not interested in search terms that do not have commercial value. Furthermore, some of the commerce queries already have a long list of well-established websites permanently occupying top search results; these are much harder for spammers to penetrate and so are less attractive to spammers. A "follow the money" approach includes discovering and accumulating spammer-targeted keywords, and heavily monitoring their top search results in which the spammers must reveal their presence in order to make money.

The spammer-targeted keywords collector component 330 may collect from various sources, including one or more of the following five sources:

(i) Anchor text associated with comment-spammed links from spammed forums (see also spam forum hunter component 340); these keywords are ranked by their total number of appearances in spammed forums;

(ii) Hyphenated keywords from spam-URL names: e.g., "fluorescent lighting" from http://www.backupyourbirthcontrol/fluorescent-lighting.dhtml;

(iii) Most-bid keywords from a legitimate ads syndication program, that have been spammed;

(iv) Customer complaints about heavily spammed keywords; and (v) Honeypot search terms that are rarely queried by regular users but heavily squatted by spammers that are thirsty for any kind of traffic: these include typos such as "gucci handbg", "cheep ticket", etc., and unusual combinations of keywords from keyword-blanket pages as already discussed.

The search monkey(s) component 310 can accept a set of search terms and perform a query for each search term to retrieve the top-N search results, compile a list of unique URLs, and optionally launch a full-fledged browser to visit each URL (referred to as "primary" URLs) to ensure that spam analysis is applied to the traffic that leads to the true user-seen content. The component 310 may record all resulting HTTP traffic at the network level, including header and content of each request and response. Accordingly, through use of the component 310, each URL can be represented by a set of traffic data, number of its appearances in all the search results and optionally additional pieces of information, as described below.

The component 310, as inferred, may perform search, scan and analysis. With respect to analysis, the component 310 may perform similarity analysis (e.g., based on appropriate information) to detect anomalies of correlations among search results. These correlations indicate likely spam and can be used to produce a prioritized list of groups of spam URL suspects. As shown in FIG. 3, the exemplary architecture 300 provides grouped spam URL suspects to the spam verifier component 370.

An extensive study of hundreds of thousands of spam pages using various components of the exemplary architecture 300 revealed that the following five types (i-v) of similarity analyses are useful for catching large-scale spammers:

(i) Redirection domains. Grouping based on individual redirection domains appears to be the simplest form of similarity analysis. Accordingly, at the end of each batched scan, primary URLs can be grouped under each third-party domain they generated redirection traffic to. The top third-party domains based on the group size (e.g., excluding well-known legitimate ads syndicator domains, web-analytics domains, and previously known spammer domains) can be identified as top suspects for spam investigation. Various large-scale spammers create many thousands of doorway pages to redirect to a single domain and redirection grouping analysis can identify thousands of spammer redirection domains. In most cases, one particular redirection domain—the final-destination domain—is most useful in identifying spammers. The final-destination domain refers to the domain that appears in the browser address bar when all redirection activities finish. Described further below, demonstration results show that, among all web pages that eventually land on third-party final-destination domains, a high percentage of these are spam.

To capture spammers that use a large frame to pull in third-party content without changing the address bar, a "most-visible frame" analysis may be used that identifies the frame with the largest size and highlights the redirection domain that is responsible for supplying the content for that frame. For example, the main content for the spam page http://rme21-california-travel.blogspot.com comes from the third-party domain results-today.com, even though the address bar stays on blogspot.com. Thus, as described herein, exemplary techniques can identify a domain (e.g., results-today.com) as being a major redirection (if not the major) domain associated with a most-visible frame.

Another special form of redirection-based grouping is domain-specific client-ID grouping. Such grouping is made possible by ads syndicators and affiliate-program providers that embed their client-IDs as part of a redirection URL(s) (e.g., presumably for accounting purposes). For example, these two spam doorway URLs belong to the same GOOGLE® AdSense customer with ID "ca-pub-4278413812249404": http://mywebpage.netscape.com/todaysringtones/free-nokia-ringtones/ and http://www.blogcharm.com/motorolaringtones/. The two URLs under http://hometown.aol.com/kliktop are associated with the same Expedia "affcid=41591555" as already discussed.

Redirection spammers are likely to start obfuscating their redirection patterns once all major search engines employ the above exemplary straightforward and effective redirection analysis. Table 1, below, gives an example of how a more sophisticated redirection-similarity analysis can be applied to identifying spam pages that do not use third-party redirections.

TABLE 1

A redirection spam page sharing a similar traffic pattern as a non-redirection spam page.

| Redirection URLs (under http://yahooooo.info/) | Size |
|---|---|
| images/klikvipsearchfooter.gif | 768 |
| images/klikvipsearchsearchbarright.gif | 820 |
| images/klikvipsearchsearchbarleft.gif | 834 |
| images/klikvipsearchheader.gif | 2,396 |
| images/klikvipsearchsearchbar.gif | 9,862 |

(a) Primary URL: http://bed-12345.tripod.com/page78book.html

| Redirection URLs (under http://tramadol-cheap.fryeart.org) | Size |
|---|---|
| images/crpefooter.gif | 768 |
| images/crpesearchbarright.gif | 820 |
| images/crpesearchbarleft.gif | 834 |
| images/crpeheader.gif | 2,396 |
| images/crpesearchbar.gif | 9,862 |

(b) Primary URL: http://tramadol-cheap.fryeart.org/

Although the spam URL in (a) redirects to http://yahooooo.info/ but the one in (b) displays content only from its own domain, the two redirection patterns suggest that they are most likely associated with the same spammer (or spam software) because the corresponding GIF files all have exactly the same size.

Generalizing the analysis further, another similarity measure can be applied where each URL is modeled by the number of HTTP response objects and their sizes (i.e., a multiset of response object lengths). The similarity between two URLs can be measured by the Jaccard's coefficient as the size of the intersection (i.e., minimum number of repetitions) divided by the size of the union (i.e., maximum number of repetitions).

(ii) Final user-seen page content. Final user-seen page content could directly come from the content of one of the HTTP responses or it could be dynamically generated by browser-executed scripts. As described herein, content signatures from such a page can be used for grouping purposes. For example, the ads links shown on the two pages (indicated below) share the same aggregator domain name (in IP-address form) 66.230.138.211.

```
http://free-porn.IEEEPCS.org/
http://HistMed.org/free-porn.phtml
```

(iii) Domain WhoIs and IP address information. As described herein, for many largest-scale spammers, IP address- or subnet-based grouping is most effective. As an example, consider that the following two different-looking blog pages http://urch.ogymy.info/ and http://anel.banakup.org/ are hosted on the same IP address 72.232.234.154. Analyses using various exemplary techniques show that is not uncommon to find that multiple redirection domains share the same IP address/subnet or WhoIs registrant name. For example, these two redirection domains share the same IP address 216.255.181.107 but are registered under different names ("→" means "redirects to"):

```
http://hometown.aol.com/seostore/discount-coach-purse.html
    → topsearch10.net
http://www.beepworld.de/memberdateien/members101/satin7374/
buy-propecia.html
    → drugse.com
```

As another example, these two redirection domains share the same registrant name, but are hosted on two different IP addresses:

```
http://9uvarletotr.proboards51.com/ → paysefeed.net
http://ehome.compuserve.de/copalace15/tracfone-ringtones.html
    → arearate.com
```

(iv) Link-query results. As described herein, link-query results provide two possibilities for similarity grouping:

(a) link-query result similarity: for example, the top-10 link-query results for http://ritalin.r8.org and http://ritalin.ne1.net/ overlap 100% and have a 50% overlap with those for the beepworld.de spam URL (as already mentioned above). This finding suggests that these two are very likely comment-spammed by the same spammer.

(b) "link-query result sharing": for example, when a pair (or more) of spam URLs appear in each other's link-query results, this is a strong indication that the pair belong to the same link farm.

(v) Click-through analysis. As described herein, when spam pages are identified as potential ads-portal pages through simple heuristics, redirection traffic following an ad-clicking can be useful for grouping. For example, the following two ads-portal pages look quite different:

```
http://cheap-air-ticketoo.blogspot.com/
http://hometown.aol.com/discountz4you/cheap-hotel-ticket.html
```

However, upon clicking an ORBITZ® ad displayed on either page, a redirection chain is generated that includes the same syndicator domain looksmart.com.

The spam verifier component 370 operates to verify that a URL is associated with spam. As shown in FIG. 3, the component 370 may confirm a URL is a spam URL, identify a URL as being associated with known bad signatures (e.g., one or more spammer redirection domains), and/or identify a URL as being associated with one or more spam heavy domains.

According to the architecture 300 of FIG. 3, for each group of spam-URL suspects produced by the search monkey(s) component 310, the spam verifier component 370 extracts a sample set of URLs, performs one or more types of analyses on each URL to gather evidence of spamming behavior, and computes an average spam score for the group. Groups with scores above a spam score threshold are classified as confirmed spam. As shown in FIG. 3, confirmed spam URLs are submitted to the spammed-forum hunter component 340 and the spammer targeted keyword collector component 330, while confirmed spammer redirection domains are added to the known-bad signature used by both the targeted patrol & hunting component 380 and the search monkey(s) component 310 (as indicated by a dashed line). For a further level of analysis, remaining unconfirmed groups of URLs may be submitted to human judges for manual investigation.

Figure 5:
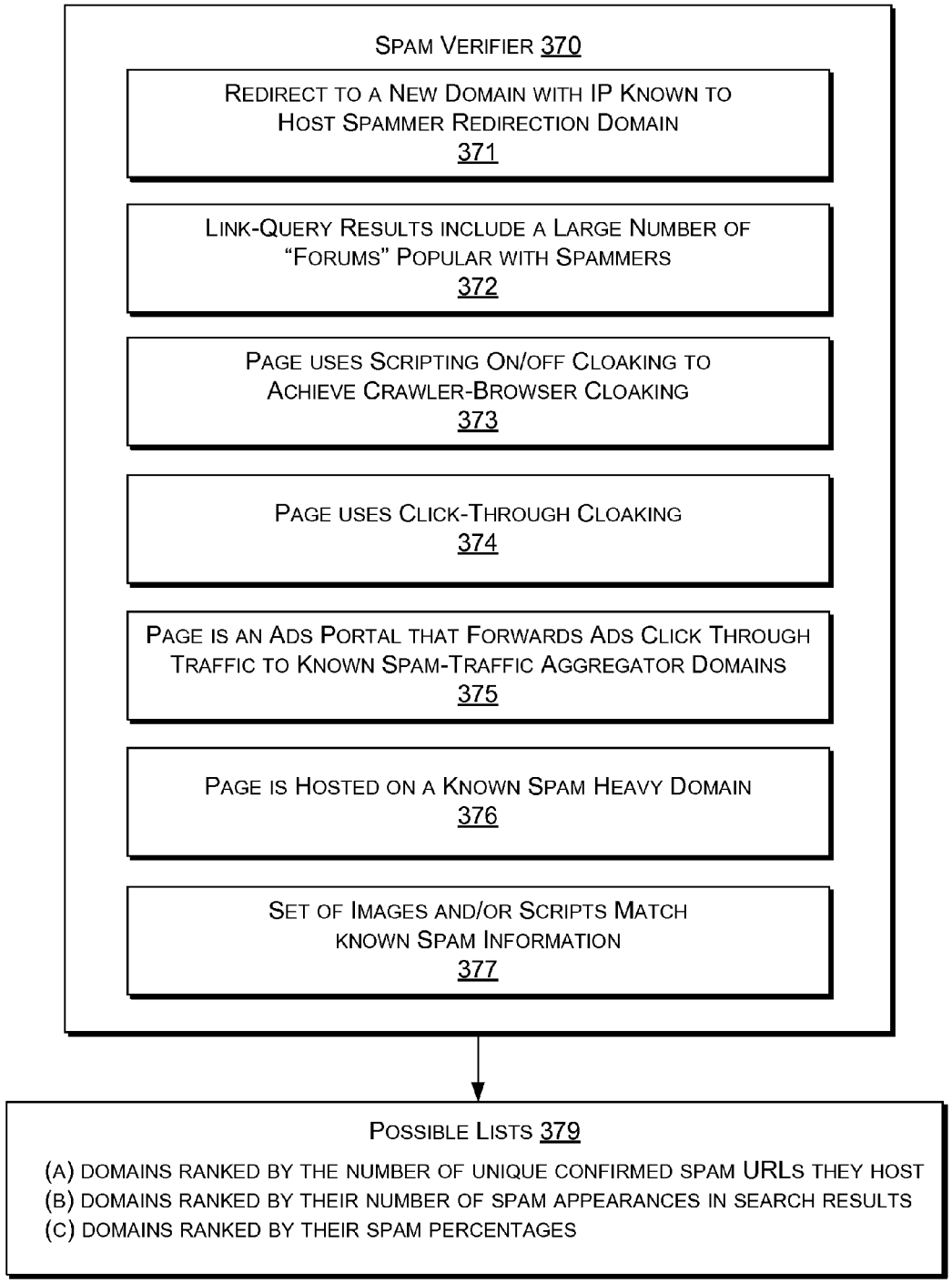
FIG. 5 is a diagram of an exemplary spam verifier component that uses one or more techniques to verify a spam URL and to optionally output one or more lists or groups of URLs.

As shown in FIG. 5, the spam verifier component 370 may use one or more of the following seven types of spam analyses:

Analysis 371 can determine whether the page redirects to a new domain residing on an IP address known to host at least one spammer redirection domain;

Analysis 372 can determine whether its link-query results contain a large number of forums, guest books, message boards, etc. that are known to be popular among comment spammers;

Analysis 373 can determine whether the page uses scripting-on/off cloaking to achieve crawler-browser cloaking (e.g., by comparing two vectors of redirection domains from visiting the same page twice, for example, once with regular browser settings and the second time with browser scripting turned off);

Analysis 374 can determine whether the page uses click-through cloaking (e.g., by comparing the two redirection vectors from a click-through visit and a direct visit, respectively);

Analysis 375 can determine whether the page is an ads-portal page that forwards ads click-through traffic to known spam-traffic aggregator domains;

Analysis 376 can determine whether the page is hosted on a known spam-heavy domain; and Analysis 377 can determine whether a set of images or scripts match known-spam filenames, sizes, and/or content hashes (e.g., known spam information).

The spam verifier component 370 can produce, for example, one or more of following three ranked lists 379 to help prioritize targeted self-protection: (a) domains ranked by the number of unique confirmed spam URLs they host; (b) domains ranked by their number of spam appearances in the search results; and (c) domains ranked by their spam percentages—number of unique spam URLs divided by number of all unique URLs that appear in the search results.

As already discussed, self-protection components 402 include one or more relevance ranking algorithms 320, a spammed forum hunter component 340, a URL extractor component 360 and a targeted patrol and hunting component 380. These components can operate based at least in part on spam analysis results from one or more of the self-monitoring components 404. Self-protection components 402 are responsible for taking actions to defend a search engine against detected spammers. Various exemplary techniques can provide a long-term solution to strengthen one or more ranking algorithms and can provide a short-term solution to clean up existing damages.

The spammed forum hunter component 340 can receive or otherwise access confirmed spam URLs as input. Based on this input, the spammed forum hunter component 340 can perform a link-query for each confirmed spam URL to collect spammed forums that have successfully promoted a spam URL into top search results. The spammed forum hunter component 340 can extract all third-party URLs that appear in such forums and feeds these URLs to the targeted patrol and hunting component 380. The spammed forum hunter component 340 can also extract associated anchor text (which consists of the keywords that the spammers want search engines to index and are usually the search terms they are targeting) and feed the anchor text to the keyword collector component 330.

With respect to strengthening one or more relevance ranking algorithms, for a spam link to appear in top search results, a relevance ranking algorithm must have made a mistake in its link-based ranking 322 and/or its content-based ranking 324. In other words, the spammers must have successfully reverse-engineered one or more ranking algorithms and crafted their pages and links in a manner that exploits (i.e., fools) a ranking algorithm.

The architecture 300 can help identify the weakness exploited by spammers through various pieces of information acquired via spam analysis (see, e.g., information markers 321, 323 and 325). As already mentioned information 321, 323 and 325 may be provided to the one or more ranking algorithms 320.

More specifically, according to FIG. 3, confirmed spam URLs 323, spammer-targeted keywords 321, and spam-heavy domains 325 are provided to the link-based ranking algorithm(s) 322 to better train the classifier that is responsible for identifying web pages whose outgoing links should be discounted. In particular, web forums that contain multiple spammer-targeted keywords across unrelated categories (such as drugs, handbags, and mp3) and multiple URLs from different spam-heavy domains are very likely spammed forums that should be flagged. Where many spammed forums sharing an uncommon URL sub-string, such a condition often indicates that a new type of forum has been discovered by spammers.

Confirmed spam URLs 323 can be also provided to the content-based ranking algorithm(s) 324. If these URLs correspond to cloaked pages, their indexed fake pages should be excluded from the ranking to avoid "contaminating" the relevance evaluation of good pages; however, if these URLs are not cloaked pages, their content should be analyzed for new content-spamming tricks. In either case, the spam pages can be used to extract more spammer-targeted keywords to feed the search monkey(s) component 310.

The targeted patrol and hunting component 380 can receive or otherwise access any of a variety of information (e.g., spam heavy domains, spam URL suspects, known bad signatures, etc.). The observation that a large-scale spammer has successfully spammed the keywords that the search monkey(s) component 310 is monitoring can often indicate that these spammers are systematically attacking a weakness in one or more ranking algorithms and most likely have penetrated many other unmonitored keywords as well. The targeted patrol and hunting component 380 can hunt down as many spam pages belonging to the same spammer as possible so that damages can be controlled in the short term while longer-term solutions that involve ranking algorithm modifications are developed.

Since an unmonitored set of keywords is much larger than a monitored set of keywords, the targeted patrol and hunting component 380 can rely on the following "spam-heavy lists" to prioritize the use of machine resources:

(i) Targeted patrol of search results hosted on spam-heavy domains can address the following practical issue: suppose the self-monitoring part can only afford to cover N search terms and there exists approximately the same number of machines for the self-protection part but a goal is to clean up about 10×N search terms. To prioritize the search results to scan, an exemplary approach uses the lists of top spam-heavy domains and top spam-percentage domains produced by the spam verifier component 370 to filter the larger set of search results for targeted patrol.

(ii) Targeted hunting of spam suspects from spammed forums can, given an identified set of spammed forums as the culprits for successfully promoting some spam URLs, identify other URLs that appear in the same forums as very likely enjoying the same bogus link support and as having a better chance of getting into top search results. A trial demonstrated effective spam hunting through targeted scanning of such spam suspect lists.

(iii) Malicious spam URLs have been observed. In particular, some malicious website operators are using search spam techniques to access more client machines, to exploit browser vulnerabilities and to install malware. An exemplary SR system can operate in conjunction with one or more honey monkeys that use a virtual machine-based, active client-side honeypot to detect malicious websites. Spam URLs detected by such a SR system can be submitted to the one or more honey monkeys to check for malicious activities. Once a spam URL is determined to be malicious, it can be immediately removed from an index to protect search users. Further, spam suspects from its link-query results can be scanned with high priority. A trial uncovered a malicious URL occupying a large number of top search results at a major search engine.

As mentioned, various trials were performed using exemplary techniques discussed herein. A trial used a list of spammer-targeted keywords that was previously constructed. Starting with a list of 4,803 confirmed spam URLs, an exemplary system used link-queries to obtain 35,878 spammed forums, from which were collected 1,132,099 unique anchor-text keywords with a total of 6,026,699 occurrences. Keywords were then ranked by their occurrence counts to produce a sorted list. To minimize human investigation effort, the trial focused on only spam pages that redirected to third-party final destinations. Unless mentioned otherwise, the trial considered the top-20 results for each search query.

With respect to self-monitoring components, trial data illustrate how these components can address search spam issues. In particular, trial data demonstrate that final destination-based grouping can identify large-scale spammers that successfully spammed the GOOGLE® search engine and the YAHOO!® search engine; that search-term typos can be used as honeypots; that grouping analyses based on intermediate redirection domains and IP addresses can catch traffic-affiliate spammers that successfully spammed MICROSOFT® LIVE SEARCH® search engine.

With respect to a final destination and doorway analysis, the top-100 handbag-related keywords were selected from a spammer-targeted list and used by a search monkey component to scan and analyze search results from both GOOGLE® search engine and YAHOO!® search engine. Table 2 compares the percentages of unique URLs among all URLs (row [a]), the percentage among unique URLs that landed on third-party final destinations (row [b]), and the percentage of those URLs that were determined as spam (row [c]).

TABLE 2

Top-100 Handbag Keywords ($3^{rd}$ means "landing on third-party final destinations")

| | | GOOGLE non-typos | YAHOO! non-typos | GOOGLE typos | YAHOO! typos |
|---|---|---|---|---|---|
| [a] | # uniq/all | 55% | 79% | 39% | 50% |
| [b] | % uniq 3rd | 1.8% | 7.1% | 47% | 50% |
| [c] | % spam 3rd | 80% | 85% | 99% | 79% |

Table 3 summarizes the redirection analyses for all detected spam URLs, where the first column is the list of final-destination domains sorted by the number of search-result appearances that redirected to them (the 4th column) and the second column contains the list of doorway domains for each final-destination domain, sorted by the number of appearances (the 3rd column).

TABLE 3

Redirection Analyses of Top-100 Handbag Keywords (Non-Typo)

| Final-destination domain (GOOGLE) | Doorway domain | # app./ # uniq | # app./ # uniq |
|---|---|---|---|
| #1: lyarva.com | forumfactory.com | 21/1 | 44 (2.2%)/4 |
| | onlinewebservice6.de | 20/1 | |
| | foren.cx | 2/1 | |
| | page.tl, | 1/1 | |

TABLE 3-continued

Redirection Analyses of Top-100 Handbag Keywords (Non-Typo)

| | | | |
|---|---|---|---|
| #2: biopharmasite.info | blogigo.de (malicious URL: blogigo.de/handbag) | 32/1 | 32 (1.6%)/1 |
| #3: topsearch10.com | forumfactory.com | 8/1 | 18 (0.9%)/8 |
| | blogspot.com | 6/6 | |
| | kostenloses-forum.be | 4/1 | |
| topmeds10.com | blogspot.com | 1/1 | 1 |
| kikos.info | blogspot.com | 1/1 | 1 |
| hachiksearch.com | asv-basketball.org | 1/1 | 1 |
| Total | * | * | 97 (49%)/16 |

| Final-destination domain (YAHOO!) | Doorway domain | # app./ # uniq | # app./ # uniq |
|---|---|---|---|
| #1: shajoo.com | onlinehome.us | 16/16 | 50 (2.5%)/50 |
| | freett.com | 15/15 | |
| | eccentrix.com | 5/5 | |
| | lacomunitat.net | 4/4 | |
| | 5 misc. domains | 10/10 | |
| #2: findover.org | hometown.aol.com | 30/17 | 30 (1.5%)/17 |
| #3: topsearch10.com | geocities.com | 2/2 | 10 (0.5%)/7 |
| | blogspot.com | 4/1 | |
| | hometown.aol.com | 1/1 | |
| | 3 misc. domains | 3/3 | |
| maximum-search.net | 4 misc. domains | 9/4 | 9/4 |
| myqpu.com | freett.com | 5/5 | 5/5 |
| nashtop.info | toplog.nl | 4/4 | 4/4 |
| fast-info.org | mywebpage.netscape.com | 4/4 | 4/4 |
| searchadv.com | 2 misc. domains | 2/2 | 2/2 |
| results-today.com | xoomer.virgilio.it | 1/1 | 1/1 |
| filldirect.com | opooch.com | 1/1 | 1/1 |
| Total | * | * | 116 (5.8%)/95 |

Several similarities exist between the GOOGLE® search engine data and the YAHOO!® search engine data. Table 2 shows that both of them had only a small percentage of unique search-result URLs (1.8% and 7.1%) that redirected to third-party final destinations, and a large percentage of those URLs (80% and 85%) were determined to be spam. Table 3 shows that both of them had a non-trivial percentage of spam results (4.9% and 5.8% as shown in the last row) that could be detected by an exemplary SR system and both were spammed by large-scale spammers: the top-3 final-destination domains alone were responsible for 4.7% and 4.5% spam densities.

The two sets of data also exhibit significant differences. Overall, the GOOGLE® search engine data had a lower percentage of unique URLs (55% versus 79%) and its spam URLs followed a similar pattern: they had an average appearance count of 97/16=6.1, which is much higher than the YAHOO!® search engine number of 116/95=1.2. More significantly, its top-3 spam URLs had 32, 21, and 20 appearances, respectively, which are much higher than the YAHOO!® search engine maximum per-URL appearances of four. The two lists of final-destination domains and doorways domains also differ significantly (except for the most ubiquitous topsearch10.com and blogspot.com). This demonstrates how search engine-specific self-monitoring can detect new large-scale spammers that have started to defeat a current anti-spam solution so that proper, engine-specific defense mechanisms can be developed and deployed at an earlier stage to prevent large-scale damages to search quality.

To study the effect of search-term typos on redirection analysis, the word "handbag" was replaced with "handbg" in the list of keywords and search results were rescanned from the GOOGLE® search engine and the YAHOO!® search engine search. The numbers are summarized in the last two columns of Table 2. Compared to their non-typo counterparts, both sets had a significant drop in the percentage of unique URLs and an even more significant increase in the percentage of URLs that landed on third-party final destinations, among which the spam densities remain very high. This trial confirms the use of search-term typos as effective honeypots to obtain search results with a high spam density.

Among the 357 unique spam URLs in the GOOGLE® search engine data, the lesser-known blog site alkablog.com was the top doorway domain responsible for 277 (78%) of the spam URLs, followed by the distant #2 kaosblog.com (15) and #3 creablog.com (13), ahead of the #4 blogspot.com (12). Thus an exemplary system can provide information on new doorway domains that are becoming spam-heavy and should be scrutinized.

For traffic-affiliate analysis (i.e., to detect aforementioned keyword-blanket spammers) manual construction of 10 search terms occurred using unusual combinations of keywords from a keyword blanket page, for example, "George Bush mset machine learning". An exemplary automated technique may be used as an alternative, for example, by searching, scanning and analyzing random combinations or by applying informational retrieval and natural language techniques to pick search terms that have very few good matches. In addition to the 10 constructed search terms, other search terms (three) were obtained through customer complaints. Given these search terms, thirteen queries were issued at the LIVE SEARCH® search engine and all search results that the engine was willing to return were retrieved. In total, from these queries, 6,300 unique URLs were obtained, among which 1,115 (18%) landed on the two largest adult affiliate program providers: 905 to hornymatches.com and 210 to adultfriendfinder.com. Among the 1,115 spam URLs, Table 4 shows the intermediate rotators and the number of doorways associated with each. Domains #1, #4, and #5 were previously unknown spammer redirection domains at that time and have since been added to the signature set.

TABLE 4

Adult traffic affiliates and doorways

| | Adult rotators | # doorways |
|---|---|---|
| #1 | rotator.leckilecki.com/Esc.php | 686 |
| #2 | borg.w3gay.com/ | 206 |
| #3 | www.rotator.chippie.biz/My_Rotator.php | 90 |
| #4 | www.rotator.tabaiba.biz/My_Rotator.php | 80 |
| #5 | www.rotator.pulpito.biz/My_Rotator.php | 40 |
| #6 | rotator.siam-data.com/Esc.php | 10 |
| #7 | rotator.wukku.com/Esc.php | 3 |
| | Total | 1,115 |

Some of these spammers had successfully spammed YAHOO!® search results as well. Table 5 shows an alternative grouping analysis based on the IP addresses of doorways, which revealed two additional pieces of information: the close relationship between chippie.biz and tabaiba.biz, and the subnet that contained multiple IP addresses redirecting to w3gay.com.

TABLE 5

Adult traffic affiliates and IP addresses

| IP address | # doorways | Rotator association |
|---|---|---|
| 209.85.15.38 | 686 | leckilecki.com |
| 207.44.142.129 | 170 | chippie.biz (90) & tabaiba.biz (80) |
| 70.86.247.37 | 145 | w3gay.com (part 1 of 206) |
| 70.86.247.38 | 36 | w3gay.com (part 2 of 206) |
| 70.86.247.34 | 25 | w3gay.com (part 3 of 206) |
| 74.52.19.162 | 40 | pulpito.biz |
| 69.93.222.98 | 10 | siam-data.com |
| 207.44.234.82 | 3 | wukku.com |
| Total | 1,115 | * |

As for evaluations of self-protection components, three trials show actual use of the self-protection components. In particular, one trial demonstrates effectiveness of targeted patrol of spam-heavy domains, another trial demonstrates an example of link-query spam hunting, and yet another trial demonstrates an example of malicious-URL spam hunting.

To evaluate the effectiveness of targeted patrol of spam-heavy domains, a trial scanned and analyzed the top-20 LIVE SEARCH® search engine results of the top-1000 keywords from the spammer-targeted list, and derived a total of 89 spam-heavy domains by taking the union of the top-10 domains in terms of the number of hosted spam URLs and number of spam appearances, and all domains that had a higher than 50% spam percentage.

Next, a "horizontal" targeted patrol was performed of the top-20 results for the next 10,000 spammer-targeted keywords, and a "vertical" targeted patrol of the 21st to 40th search results for the entire 11,000 keywords. The latter patrol aims to minimize the chance that vacated top-20 positions are filled with spam again.

Table 6 shows that the 89-domain filter selected approximately 10% (9.8% and 9.0%) of the URLs for targeted patrol. Among them, a high percentage (68% and 65%) redirected to third-party final destinations, which indicate that this is most likely a spam-heavy list. An exemplary SR system-based analysis confirmed that more than 3 out of every 4 URLs (78% and 76%) on that list were spam. It also confirmed that targeted patrol of spam-heavy domains is productive: approximately half (53% and 49%) of the selected URLs based on spam-heavy domains were spam.

TABLE 6

Horizontal and vertical targeted patrol

| | | Top-20 results of next 10,000 keywords | Next 20 results of all 11,000 keywords |
|---|---|---|---|
| [a] | # unique URLs | 141,442 | 165,448 |
| [b] | # unique URLs on spam-heavy domains | 13,846 9.8% of [a] | 14,867 9.0% of [a] |
| [c] | # unique $3^{rd}$ | 9,395 68% of [b] | 9,649 65% of [b] |
| [d] | # spam URLs | 7,339 53% of [b] 78% of [c] | 7,345 49% of [b] 76% of [c] |

Another trial selected the top-100 travel-related search terms from the spammer-targeted list, and scanned the search results from the LIVE SEARCH® search engine. Among the 105 confirmed spam URLs, the top redirection domain searchlab.info was behind 30 doorway URLs—10 were hosted on geocities.com and 20 on angelfire.com. These 30 doorway URLs were used as seeds to evaluate the cross-category impact of targeted hunting.

Link-query results for the 10 geocities.com URLs produced a list of 1,943 spam suspects hosted on the same domain. From this list, 631 URLs were extracted that contained at least one of the following four keywords observed to be popular on the list: "parts", "handbag", "watch", and "replica". With a few exceptions of no-longer-valid URLs, all of the 631 URLs redirected to searchlab.info. Next, 630 unique search keywords were derived from these URL names and queried using the LIVE SEARCH® search engine for top-20 results. Analysis of the results found that 138 URLs had a total of 161 appearances in the top-20 results of 142 unique search terms. In particular, 50 appearances were among the top-3 search results for queries like "expensive watches", "free webcams to watch", "volkswagon parts", "designer handbag replicas", etc. The middle column of Table 7 summarizes the results.

TABLE 7

Link-query Spam Hunt Cross-category Effect

|   | Geocities.com | Angelfire.com |
|---|---|---|
| # suspect URLs | 631 | 1,710 |
| # keywords | 630 | 1,598 |
| # unique URLs in top-20 | 138 | 134 |
| # top-20 appearances | 161 | 229 |
| # top-3 appearances | 50 | 102 |
| # spammed keywords | 142 | 172 |

A similar trial was conducted on the 20 angelfire.com spam URLs except that spam suspects whose URL names contain travel-related keywords or any of the previous four keywords were filtered out. The analysis collected a total of 1,710 angelfire.com spam suspects, from which 1,598 unique search terms were derived. These terms were from diverse categories such as "free maid of honor speeches", "daybed mattress discount", "cheap viagra uk", "free pamela anderson video clip", etc. Again, searchlab.info was behind almost all of the still-active spam URLs. The right-most column of Table 7 summarizes the results: 134 unique URLs had 229 spam appearances in the top-20 search results of 172 keywords, including 102 top-3 appearances. These two sets of data confirm that, if a large-scale spammer is observed to have successfully spammed a set of keywords at a search engine, it is very likely that it has also spammed other keywords and link-query spam hunting is an effective way to discover those spam URLs.

With respect to malicious spam hunting, honey monkey component scanning of the 16 GOOGLE® search result analysis spam URLs detected (as described above) revealed that the one with the highest number of per-URL appearances (32) was actually a malicious URL: http://blogigo.de/handbag (spaces added for safety to avoid inadvertent access to this malicious URL).

By performing 100 queries of "site:blogigo.de" in conjunction with the 100 handbag keywords, the trial obtained 27 URLs for honey monkey component scanning and identified an additional malicious URL: http://blogigo.de/handbag/handbag/1. Through a link-query spam hunt, 14 blogigo.de spam suspects were discovered and another malicious URL: http://blogigo.de/pain_killer was identified, which appeared as the number 7 GOOGLE® search engine search result for "pain killer".

This example demonstrates that, when a search engine makes a mistake and assigns a high ranking to a malicious spam URL, the damages on search-result quality and the potential damages on visitors' machines can be wide-spread. Hence, the importance of search engines monitoring for malicious search results and removal is demonstrated for to protect search users.

The foregoing trials demonstrate that redirection domain-based grouping is effective in identifying spammers, especially those that redirect their spam pages to third-party final destinations. Two sets of data from Table 2 and Table 6 show consistent results: spam-heavy lists of URLs tend to have a high percentage (about 47% to about 68%) that land on third-party final destinations and, among those URLs, a large percentage (about 76% to about 99%) are spam. Trial evidence shows that automated and systematic, large-scale spamming activities leave traces of patterns that can be discovered.

The exemplary self-protection components includes a targeted patrol and hunting component that aims at increasing spammers' costs by wiping out their investment at the first sign of success of some of their spam. Trials demonstrate that such targeted actions are often productive and can have immediate positive impact on search quality. In particular, Table 6 showed that targeted scan-candidate selection based on spam-heavy domains produced a list of suspects with a high hit rate (about 49% to about 53%) and Table 7 showed that spam hunting targeting a particular spammer allowed effective clean-up across a broad range of keywords.

Search Ranger System

Figure 6:
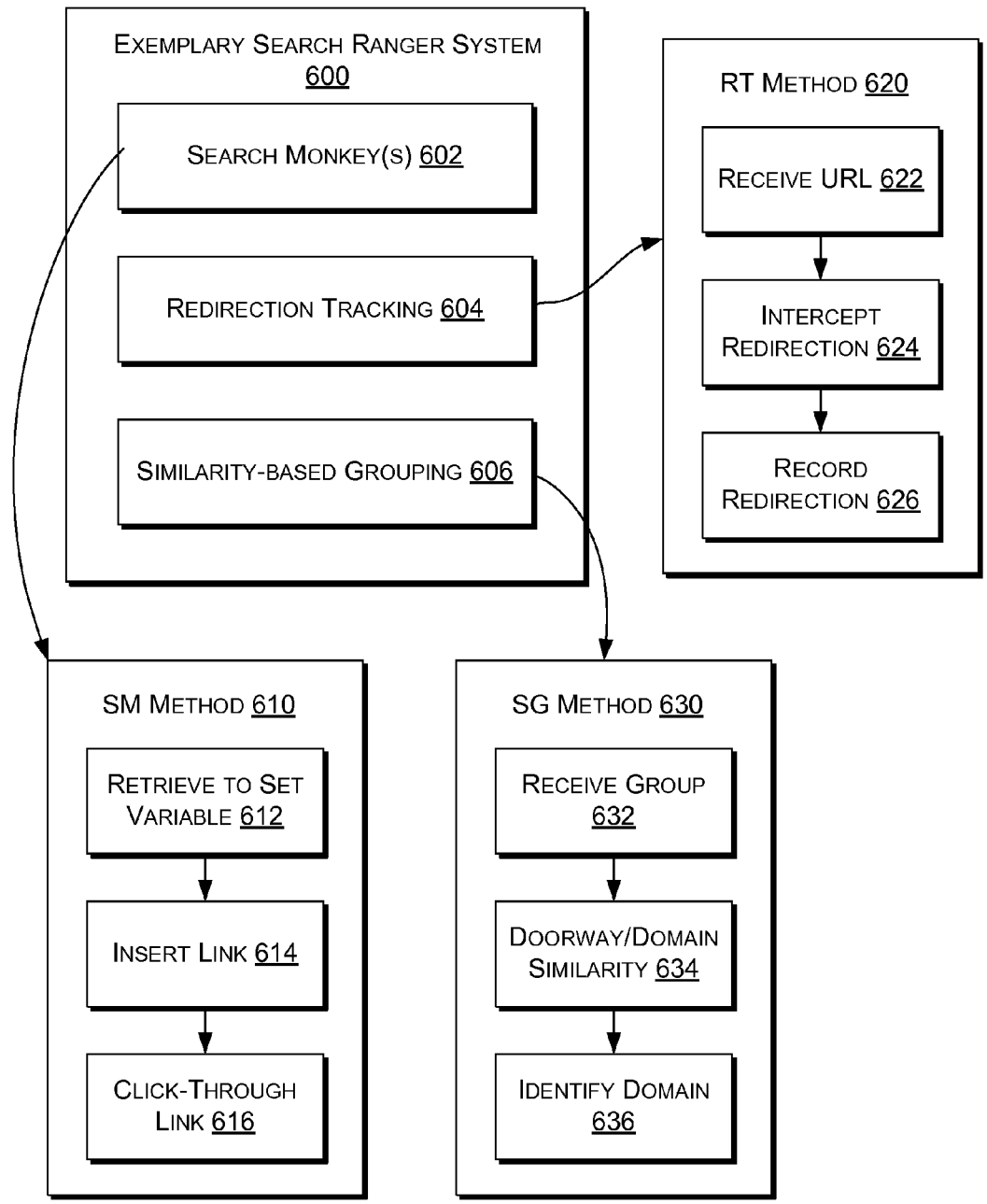
FIG. 6 is a diagram of an exemplary search ranger system and some associated methods.

Various examples have been discussed above along with trials to demonstrate how components can operate to monitor for spam and to protect against spam. An exemplary system may include any number of components to achieve a particular goal. For example, FIG. 6 shows a more general arrangement of components as an exemplary SR system 600 that provides for spam detection. The SR system 600 includes a search monkey(s) component 602, a redirection tracking component 604 and a similarity-based grouping component 606.

The search monkey(s) component 602 can perform web patrol. Since search engine crawlers typically do not execute scripts, spammers exploit this fact using crawler-browser cloaking techniques, which serve one page to crawlers for indexing but display a different page to browser users. To defend against cloaking, the search monkey(s) component 602 is used to visit each web page with a browser (e.g., a full-fledged popular commercial browser), which executes all client-side scripts. To combat newer click-through cloaking techniques (i.e., those that serve spam content only to users who click through search results), the search monkey(s) component 602 can perform an exemplary method 610 that mimics click-through by retrieving a search-result page to set the browser's document.referrer variable 612, inserting a link into the spam page in the search-result page 614, and clicking through the inserted link 616.

With respect to the redirection tracking component 604, common approaches to detecting "spammy" content and link structures merely catch "what" spammers are doing today. By contrast, a "follow the money" approach includes tracking traffic redirection. Such an approach can reveal information to identify "who" is or are behind spam activities, even if spam techniques evolve. The redirection tracking component 604 may be a URL tracer (see, e.g., the related co-pending patent application) that can intercept browser redirection traffic at the network layer to record all redirection URLs. An exemplary method 620 includes receiving a URL 622, intercepting redirection 624 and recording one or more redirection URLs 626. As explained below, redirection analysis can be applied to tracking both ads-fetching traffic and ads click-through traffic.

The similarity-based grouping component 606 can assist in identifying large-scale spam. Rather than analyzing all crawler-indexed pages, the exemplary SR system 600 can focus on monitoring search results of popular queries targeted by spammers to obtain a list of URLs with high spam densities. The system 600 can then analyze similarities between redirections from these pages to identify related pages, which are potentially operated by large-scale spammers. In a basic configuration, a similarity-based grouping component identifies doorway pages that share the same redirection domain. An exemplary method 630 includes receiving a group 632, performing a doorway/domain similarity analysis 634 and identifying one or more domains based at least in part on the analysis 636. After verification that the domain is responsible for serving the spam content, the domain can be used as a seed to perform "backward propagation of distrust" to detect other related spam pages.

Figure 7:
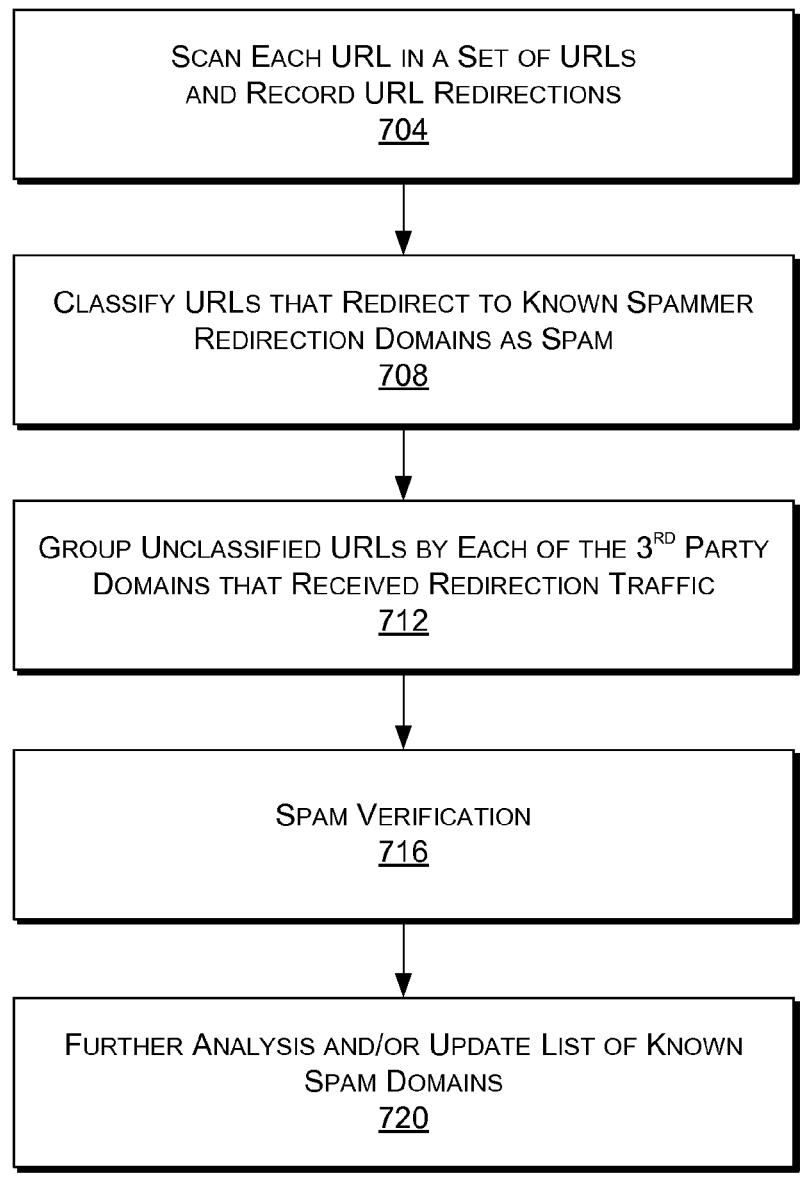
FIG. 7 is a diagram of an exemplary spam detection method.

FIG. 7 shows an exemplary method 700 for spam detection. The method 700 commences in a scan and record block 704 that scans URLs and records URL redirections. For example, given a set of search terms and a target search engine, a search monkey(s) component can retrieve the top-N search results for each query, remove duplicates, and scan each unique URL to produce an XML file that records all URL redirections. A classification block 708 classifies URLs that redirect to known spammer redirections as spam. For example, at the end of a batched scan per the scan block 704, an exemplary SR system applies redirection analysis to all the XML files to classify URLs that redirected to known-spammer redirection domains as spam. For unclassified URLs, a grouping block 712, groups the unclassified URLs by each of the third-party domains that received redirection traffic. For each group, a spam verification block 716 submits sample URLs to a spam verifier, which gathers evidence of spam activities associated with these URLs. For example, the spam verifier can check if each URL uses crawler-browser cloaking to fool search engines or uses click-through cloaking to evade manual spam investigation. It can also check if the URL has been widely comment-spammed at public forums. According to the further analysis and/or update block 720, groups of unclassified URLs, ranked by their group sizes and tagged by spam evidence, may be further analyzed by human judges. Once such judges determine a group to be spam, an exemplary SR system can add the redirection domains responsible for serving the spam content to the set of known spam domains. The updated list can be used in the classification block 708 for future scans.

Cloaking Techniques

As mentioned, through cloaking a spammer can serve one page to search-engine crawler to optimize ranking, but serve a different page to a browser user to maximize potential profit. In click-through cloaking spammers serve non-spam content to browsers that visit the URL directly without clicking through search results, in an attempt to evade spam detection by human spam investigators and anti-spam scanners. Referring to the redirection tracking component 604, this component can intercept browser redirection traffic at the network layer to record all redirection URLs. Such a component may implement an exemplary anti-cloaking technique that makes every visit from a tracer appear to come from a search click-through for both server-side and client-side referrer checks. Results from such a technique can be used with the spam verifier component 370. For example, per the analysis 374, if a page uses click-through cloaking, that page is likely to be associated with a spammer.

Figure 8:
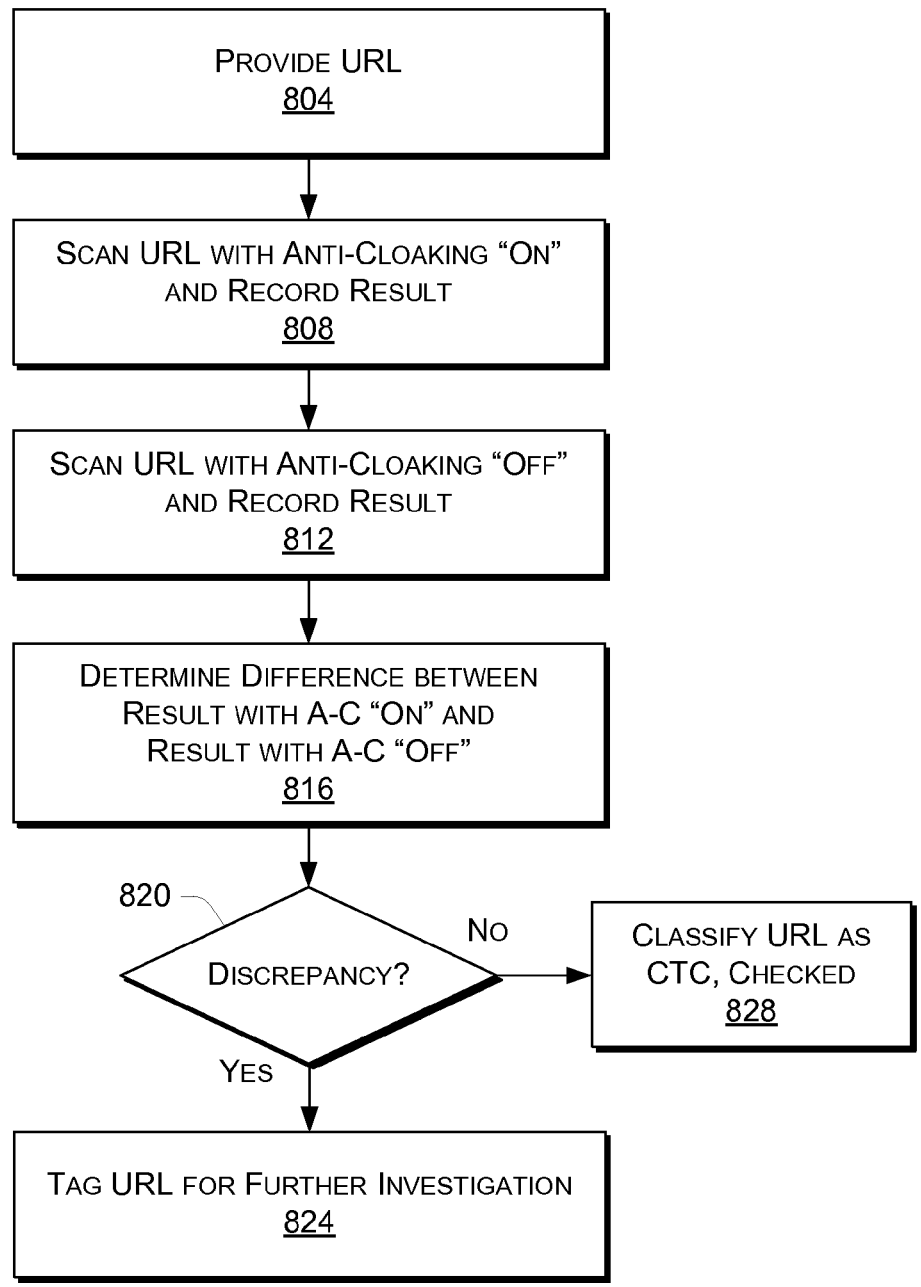
FIG. 8 is a diagram of an exemplary method that uses an anti-cloaking technique for URLs that use click-through cloaking.

FIG. 8 shows an exemplary method 800, referred to as a "diff-based" method. The method 800 relies on anti-cloaking to turn spammers' cloaking activities against themselves. According to this diff-based method, for every suspicious URL that does not redirect to any known-bad domains, the URL can be scanned twice with anti-cloaking on and off, respectively, and a difference of the resulting two URL redirection lists recorded. If a significant discrepancy exists between the on and off scans, the URL can be tagged for further investigation (e.g., manual investigation). Once a tagged URL is confirmed to be spam, its associated spam domain(s) can be added to a blacklist and used by all future anti-cloaking scans to identify similar URLs associated with the same spammer. This diff-based technique turns an adversary's devious activities against itself by taking a diff of "the truth" and "the lie": "the truth" is the actual page displayed to users and "the lie" is the page displayed to spam investigators that do not click through search results.

Referring to FIG. 8, the method 800 commences in a provision block 804 that provides a URL. A scan block 808 scans the URL with an anti-cloaking (A-C) technique "on" and records the result while another scan block 812 scans the URL without the A-C technique (i.e., A-C "off"). A determination block 816 determines the difference between the result with A-C "on" and the result with A-C "off". A decision block 820 decides if a discrepancy exists that would warrant further investigation of the URL with respect to spam activity. If the decision block 820 decides a significant discrepancy exists, then the method 800 continues in a tag block 824 that tags the URL for further investigation; otherwise, the method 800 may enter a classification block 828 that classifies the URL as not using click-through cloaking (CTC) and as being checked as OK.

Various trials uncovered use of different cloaking techniques, which were classified as into three categories: server-side, client-side, and combination. A discussion follows that shows how the aforementioned redirection diff-based approach can detect spam by turning spammers' cloaking techniques against themselves. Several case studies use redirection-diff in IP subnet-based spam hunting to defend a major search engine against stealth spam pages that use click-through cloaking.

Various spammers give crawlers a keyword-stuffed page to index but redirect browser users to an ads-portal page with numerous related links (e.g., for purchase of goods). Such "crawler-browser cloaking" behavior can be achieved through "scripting-on/off cloaking" in which the same page that contains both scripts and static text is provided to the crawlers (which do not execute scripts and so see the text) as well as to the browsers (which normally execute scripts and so see a rewritten or redirected page).

Click-through cloaking differs from crawler-browser cloaking. A significant percentage of spam blogs created on a major blog site use click-through cloaking. More particularly, spammers use click-through cloaking to implement stealth web pages by serving a non-spam page to browser users who visit the URL directly without clicking through a search result. This design evades spam detection by anti-spam scanners and human spam investigators. For example, by redirecting non-click-through visitors to a bogus non-existent page, the spammers hope to hide their behind-the-scenes, ads-serving domains from spam investigation.

As described herein, an exemplary anti-cloaking scanner and redirection diff-based spam detection tool can identify spam. In trials, discussed below, some of the spam pages were "throw-away" pages created on free hosting websites as doorways to redirect to spammer-operated domains, some of them might have a short lifetime and are no longer active. Yet, once a cloaked page has been identified as spam, it can be used as a seed to hunt for more spam URLs and to eliminate them to improve the quality of search results.

Before discussing details of the anti-cloaking scanner and redirection diff-based spam too, a brief overview of various behaviors exhibited by spam pages that use click-through cloaking is presented along with a survey of different cloaking techniques, divided into three categories. An example of malicious websites that use cloaking to evade security investigation is also discussed.

Spammers are in the business to make money. So when users click through search results to reach their pages, they want to show content that has commercial value. Broadly, such content can be divided into three categories: (1) ads-portal pages from which spammers make money by participating in pay-per-click programs; (2) merchant websites which spammers directly own or get paid from through traffic affiliate programs (many casino, pornography, mp3, and travel websites belong to this category); and (3) malicious scripts that exploit browser vulnerabilities to install malware programs that steal personal information for illegal purposes. It is not uncommon to see malicious websites simply close the browser window after a successful exploit.

When spam pages encounter non-click-through visitors, the spammers know that they are very likely under investigation; so they want to show non-spam content that minimizes potential damages. Five different cloaking behaviors have been observed during an extensive, 6-month spam investigation:

(1) "Page not found" message: the spam page pretends to be non-existent and sometimes claims that a user must have made a typographical error;

(2) "Page has been deleted for abuses" (e.g., violations of terms-of-use): this message aims to convince a user that somebody else has reported the spam and the problem has been taken care of;

(3) Redirecting to known-good sites such as google.com or msn.com: this attempts to bypass automatic anti-spam scanners that white-list these known-good sites;

(4) Staying on the current page (e.g., a blog page or an empty page): this is to avoid exposing the behind-the-scenes redirection domains; and (5) Redirecting to fake spam-reporting websites: for example, spampatrol.org is a commonly seen redirection target for cloaked spam pages. This page asks a user for her name and email address and promises that "This site will be closed in five days for a comment and e-mail spam". However, spampatrol.org shares the same IP subnet as many other suspicious drugs- and porn-related websites that use cloaking and is most likely a fake spam-reporting site.

As mentioned, click-through cloaking techniques can be classified into three categories: server-side cloaking, client-side cloaking, and combination techniques. To distinguish simple cloaking, consider that simple cloaking only tries to differentiate click-through and non-click-through visitors; whereas, advanced cloaking additionally tries to identify click-through visitors that use unusual search strings and that are most likely investigating spam leads.

Simple server-side cloaking: The simplest way to achieve click-through cloaking is for web servers to check the Referrer field in the header of each incoming HTTP request. If the referrer is a search engine URL, the server assumes that the request came from a search-result click-through and serves the spam content; otherwise, the server returns a bogus page. For example, www.intheribbons.com/win440/2077_durwood.html is a spam URL that uses simple server-side cloaking to serve spam content from lotto.gamblingfoo.com to click-through users but serve a bogus "404 Not Found" page to non-click-through visitors.

Simple server-side cloaking can be easily defeated. For example, a spam investigator can perform a query of "url: www.intheribbons.com/win440/2077_durwood.html" at live.com or yahoo.com (or an equivalent "info:" query at google.com) to obtain a link to the spam page and click through that link to visit the page. The spammers will be fooled into serving the spam content because the Referrer field in the HTTP header is indeed a URL from a major search engine.

Advanced server-side cloaking: Advanced server-side cloaking addresses the weakness by distinguishing spam investigation-style queries from regular search queries. For example, "url:" (or "info:"), "link:", "linkdomain:", and "site:" queries are commonly used by spam investigators, but rarely used by regular users. So a spam server can look for these search strings in the HTTP Referrer field and serve cloaked pages. For example, clicking on acp.edu/phentermine.dhtml from a regular search-result page would return a spam ads-portal page full of drugs-related links, but directly visiting the URL would return a bogus "HTTP 403 (Forbidden)" page. Doing a "site:www.acp.eduphentermine" query at live.com and then clicking through the link would still return the bogus page because the spam server sees the "site:" query. But issuing a query of "Order by Noon Est Time, get it tomorrow or choose 2nd day FedEx To All US States" (where the search string was copied from the page's brief summary displayed in the "site:" search-result page) and then clicking on the link would fool the server into serving the spam content.

Client-side cloaking: A major weakness of server-side cloaking, simple or advanced, is that the server cannot tell whether the Referrer field in the HTTP header is the "authentic" one generated by the browser, or a fabricated one inserted by an anti-cloaking spam detection program. In trials, such a program was implemented and tested against spam URLs that use server-side cloaking. The program was able to fool all of them into serving spam content by directly visiting them with an inserted Referrer field, without clicking through any search results. The program included initiating a direct visit and then inserting a value in the Referrer field before the original HTTP request with unmodified headers went out. This particular weakness of server-side cloaking and the increasing popularity among spammers to set up throw-away doorway pages on free hosting servers that they do not own motivated the use of client-side cloaking.

Simple client-side cloaking: The basic idea of client-side cloaking is to run a script on a client machine to check the local browser's document.referrer variable. An actual script used by the spam URL naha.org/old/tmp/evans-sara-real-fine-place/index.html follows:

```
var url = document.location + " "; exit=true;
ref=escape(document.referrer);
if ((ref.indexOf('search')==-1) && (ref.indexOf('google')==-1) &&
(ref.indexOf('find')==-1) && (ref.indexOf('yahoo')==-1) &&
(ref.indexOf('aol')==-1)
&& (ref.indexOf('msn')==-1) && (ref.indexOf('altavista')==-1) &&
(ref.indexOf('ask')==-1) && (ref.indexOf('alltheweb')==-1) &&
(ref.indexOf('dogpile')==-1) && (ref.indexOf('excite')==-1) &&
(ref.indexOf('netscape')==-1) && (ref.indexOf('fast')==-1) &&
```

```
(ref.indexOf('seek')==-1) && (ref.indexOf('find')==-1) &&
(ref.indexOf('searchfeed')==-1) && (ref.indexOf('about.com')==-1) &&
(ref.indexOf('dmoz')==-1) && (ref.indexOf('accoona')==-1) &&
(ref.indexOf('crawler')==-1)) { exit=false; } if (exit) { p=location;
r=escape(document.referrer);
location='http://ppcan.info/mp3re.php?niche=Evans, Sara&ref='+r }
```

This script checks if the document.referrer string contains the name of any of the major search engines. If the check succeeds (i.e., the "exit" variable remains true), it redirects the browser to ppcan.info/mp3re.php to continue the redirection chain which eventually leads to spam content; otherwise, it stays on the current doorway page. Since this spam URL does not use advanced cloaking, issuing a query of "url:http://www.naha.org/old/tmp/evans-sara-real-fine-place/index.html" at yahoo.com and clicking through the link would reveal the spam content.

More and more spam URLs are using obfuscated scripts to perform client-side cloaking in order to evade content-based detection by crawlers and human spam investigators. A sample of obfuscated script fragment used by the spam URL buyviagralive.blogspot.com follows:

```
<script
language="javascript">document.write("'\x3c\x73\x63\x72\x69\
x70\x74\x3e\x20\x76\x61\x72\x20\x72\x3d\x64\x6f\
x63\x75\x6d\x65\x6e\x74\x2e\x72\x65\x66\x65\x72\
x72\x65\x72\x2c\x74
...
x6e\x2e\x70\x68\x70\x3f\x72\x3d" + "blogspot" + "\x26\x67\x3d" +
"pharmacy" + "\x26\x6b\x3d" + "Buy Viagra" +
"\x22\x3b\x20\x3c\x2f\x73\x63\x72\x69\x70\x74\x3e");</script>
```

By replacing document.write( ) with alert( ), it was possible to de-obfuscate this script and see the cloaking logic that performs a similar check of document.referrer against major search engines' names as well as their specific URL structures.

Advanced client-side cloaking: Like advanced server-side cloaking, many client-side cloaking pages perform advanced checks, for example, consider the following script fragment for lossovernigh180.blogspot.com:

```
Function is_se_traffic( ) {
    if ( document.referrer ) {
        if ( document.referrer.indexOf("google")>0
            || document.referrer.indexOf("yahoo")>0
            || document.referrer.indexOf("msn")>0
            || document.referrer.indexOf("live")>0
            || document.referrer.indexOf("search.blogger.com")>0
            || document.referrer.indexOf("www.ask.com")>0)
        {
            If ( document.referrer.indexOf( document.domain )<0
                && document.referrer.indexOf( "link%3A" )<0
                && document.referrer.indexOf( "linkdomain%3A" )<0
                && document.referrer.indexOf( "site%3A" )<0 )
                { return true; }
        }
    }
    return false;
```

In addition to checking for "link:", "linkdomain:", and "site:", this script also performs a general check of whether the spam URL's domain name appears as part of the referrer string, which covers the cases of "url:" and "info:" queries. The result of this check decides the output of the is_SE_traffic ( ) function, based on which either a spam page or a bogus non-existent page is served.

Combining client-side script with server-side checking: A major weakness of client-side cloaking techniques, simple or advanced, is that the cloaking logic is exposed to spam investigators, who can then design the most effective anti-cloaking tool or procedure accordingly. To get the best of both worlds (i.e., extracting referrer information directly from the client-side document.referrer variable and hiding the cloaking logic on the server side), some spammers have migrated to a combination cloaking solution.

The following spam URL hosted on a university web site used combo cloaking lawweekly.student.virginia.edu/wwwboard/messages/007.html: it uses a client-side script to extract the document.referrer information and reports it to the spam domain 4nrop.com as part of the URL. If the referrer information passes the server-side check, the browser is redirected to a spam page hosted on raph.us; otherwise, it is redirected to lawweekly.student.virginia.edu/404.html, which is a bogus non-existent page. This spammer has attacked several other .edu websites and set up cloaked pages with similar behavior; pbl.cc.gatech.edu/bmed3200a/10 and languages.uconn.edu/faculty/CVs/data-10.php are just two such examples.

An example of obfuscated combo cloaking used by the spam URL mywebpage.netscape.com/superphrm2/order-tramadol.htm follows:

```
<script> var params="f=pharmacy&cat=tramadol";
function kqqw(s){
    var Tqqe=String("qwertyuioplkjhgfdsazxcvbnmQWERTYU
    IOPLKJHGFDSAZXCVBNM_1234567890");
    var tqqr=String(s); var Bqqt=String(" ");
    var Iqqy,pqqu,Yqqi=tqqr.length;
    for ( Iqqy=0; Iqqy<Yqqi; Iqqy+=2) {
        pqqu=Tqqe.indexOf(tqqr.charAt(Iqqy))*63;
        pqqu+=Tqqe.indexOf(tqqr.charAt(Iqqy+1));
        Bqqt=Bqqt+String.fromCharCode(pqqu);
    }
    return(Bqqt);
}
eval(kqqw-
('wKwVwLw2wXwJwCw1qXw4wMwDw1wJqGqHq8qHqSqHw_...
Bw1qHqSqHq0qHqFq7'));</script>
```

This script feeds an obfuscated string to the obfuscated function kqqw( ) to generate another script code to be executed by eval( ). To understand better the behavior of this script, eval( ) was replaced with alert( ). This replacement revealed that the script eventually reports the document.referrer information to the spam server emaxrdr.com, which then redirects the browser either to a spam page hosted on pillserch.com or to the suspicious website spampatrol.org.

Cloaked malicious web pages: A honey monkey component for detecting malicious websites that attempt to exploit browser vulnerabilities has already been described. One or more honey monkey components can run inside unpatched Virtual Machines (VMs) and mimic human browsing activities by launching an actual browser to visit each suspect website, and later identify malicious ones by detecting drive-by software installation outside browser sandbox. A honey monkey system has successfully detected thousands of websites that were exploiting known and zero-day vulnerabilities.

Some malicious website operators are using search spamming techniques to push their URLs into top search results in major search engines in order to draw more traffic to exploit. Trials discovered hundreds of malicious spam pages that used click-through cloaking. For example, at the time of a trial, the malicious URL mandevillechevrolet.com (spaces added for safety) appeared as the number 1 YAHOO!® search result for "mandeville Chevrolet", which would install a malware program named "ane.exe" under C:\ if the clicking user's machine is vulnerable. To avoid being detected by a component like the honey monkey component, the spam page used a client-side script to check document.referrer and only redirected the browser to the malicious porn site hqualityporn.com if the visit came from a search click-through. This information demonstrates the importance for exploit detection systems and human security investigators to use anti-cloaking techniques.

Anti-cloaking scanner and redirection diff-based spam detection component: To effectively detect spam pages that use click-through cloaking, an end-to-end approach includes building an anti-cloaking scanner that always visits websites by clicking through search-result pages, instead of trying to exploit the weakness of individual cloaking techniques. For example, given a suspect URL, the scanner derives from the URL name the likely keywords that the spammer is targeting, queries the LIVE SEARCH® search engine to obtain a search-result page that correctly sets the document.referrer variable, inserts a link to the suspect URL into the page, and generates a click on that link. This scanner also included a URL tracer component to record all third-party redirection domains reached as a result of the visit. If a redirection domain belongs to a known spammer, the URL is flagged as spam; otherwise, further investigation to gather evidence of spam activities is required.

Trials found that use of click-through cloaking is almost always an indication of spam because good websites do not engage in such deceptive behavior. As described herein, a redirection diff-based approach can be used to turn spammers' cloaking techniques against themselves and use it as a detection mechanism. As discussed with respect to the method 800 of FIG. 8, each suspect URL can be scanned twice—once with anti-cloaking and once without. A comparison of the two vectors of redirection domains can occur followed by flagging those URLs that exhibit a difference in the comparison.

A trial using an exemplary redirection diff-based method detected eight (previously identified) cloaked URLs with no false negatives. However, in practice, several possibilities for false positives exist: (1) some websites serve rotating ads from different domains; (2) Some websites rotate final destinations to distribute traffic among multiple downstream sites (the term "final destination" is used to refer to the URL in the address bar when all redirections have been finished); and (3) Some web accesses may fail due to transient network or server problems. Although spam judgment can often be a fairly subjective matter that requires humans to make the final determination, it is important for a tool to have a low false-positive rate in order to minimize expensive manual effort.

The following variations to a basic redirection diff-based method were effective in reducing false positives: (1) the majority of today's cloaked pages can be detected by comparing only the final destinations from the two scans (i.e., redirection-diff of size-1 vectors); (2) For each suspect URL, perform the scans and diff multiple times and exclude those that do not result in a consistent diff result; and (3) Given a group of URLs that are expected to exhibit a similar cloaking behavior, perform the scans and diff for each URL just once and exclude those that are not consistent with the rest of the group. For example, given a confirmed cloaked URL, a group of suspect URLs can be constructed by examining domains hosted on nearby IP addresses. Such a cloaked-spam hunting technique successfully identified over 10,000 spam pages and hundreds of new spammer redirection domains.

Trials on Click-Through Cloaking: Trials 1 to 8

Trial 1: False-positive Evaluation: In one trial, human experts were given the top-10 results of a search benchmark, consisting of hundreds of keywords, from a major search engine, and they identified 736 URLs as spam. Since a goal was to establish a lower bound on the percentage of cloaked spam URLs, only the final destinations from the redirection diff-based method were compared. The first scan of these 736 URLs flagged 53 of them as suspicious. The second scan excluded two of the 53 that had inconsistent diff results (both due to rotating final destinations). Manual examination of the remaining 51 found that only one (2%) of them was a false positive, again due to rotating final destinations. The lower-bound cloaking percentage among spam URLs was therefore 50/736=6.8% for this benchmark.

Trials 2 to 6: IP Subnet-based Spam Hunting: Trials 2 to 6 involved performing IP address-based spam hunting by starting with a seed URL that was successfully promoted into top search results. The range of suspect IP addresses surrounding the one that hosted the seed URL was recorded as was the number of domains hosted on those IP addresses as well as the number of URLs obtained for scanning by issuing a "site:" query for each domain. A diff-based method found a number of cloaked URLs by comparing final destinations. Overall, these trials found that IP-based spam hunting was very effective, identifying 33-99% of suspicious URLs as cloaked URLs. In total, these trials discovered 11,973 unique cloaked URLs associated with 241 unique hiding final-destination domains, many of which were previously unknown spammer redirection domains.

Trial 3 was unique in that the seed URL was not a cloaked URL, but rather a suspicious final destination for cloaked pages. Scan results show that a large percentage of sampled URLs hosted on its nearby IP addresses are cloaked URLs and they all share spampatrol.org as their bogus final-destination page, which clearly indicates that this is a fake spam-reporting page.

During trial 6, a false-positive issue was found due to self-clicking ads-portal pages. Some of the suspect URLs redirected to allishere.us/in.php?id=404 which was a final-destination, ads-portal page that would non-deterministically and automatically generate a click on one of the ads links if left unattended. That would change the recorded final-destination domain and introduce false diff results. Fortunately, thousands of suspect pages followed the "template" cloaking behavior of the seed URL and generated the two vectors as [<one of two final destinations>] vs. [none]. So it was fairly easy to simply (conservatively) exclude those diff results caused by the random clicks.

Trial 7: Redirection Diff-based of Full Vectors: Taking this cloaked URL as a seed: www.acp.edu/phentermine.dhtml, a query was issued "site:www.acp.edu" to retrieve the top-1000 results from which were extracted 825 .dhtml URLs. Since this set of URLs do not land on a third-party final destination in either scan, they require a diff of the full redirection vectors. In the first pass of the analysis, the diff-based method detected 554 (67%) of the 825 URLs as cloaked pages through the diff of [searchfeed.com] vs. [none]; the remaining 33% did not generate any third-party traffic in either scan. Based on the observation that actual spam pages all fetched images from "www.acp.edu/images/" but none of the cloaked bogus pages did, the redirection vector was extended to include this non-third-party URL prefix. In turn, this trial confirmed that all 825 URLs used cloaking. In fact, it was later discovered that this site was actually hosting a keyword-based ads engine that could generate an infinite number of cloaked URLs. For example, visiting this arbitrarily constructed URL www.acp.edu/garbage-in-garbage-out.dhtml with an exemplary anti-cloaking scanner returned a list of ads based on the keywords "garbage in garbage out", while visiting the URL directly returned a bogus page.

Trial 8: Malicious URL Spam Hunting: Taking malicious URL: mandevillechevrolet.com as a seed (spaces inserted for safety), 118 suspicious domains hosted on its nearby IP addresses were extracted. Since the cloaked malicious behavior was exhibited at the domain level, only the 118 domain-level pages were scanned. An exemplary diff-based tool detected 90 (76%) of the 118 URLs as cloaked URLs that were hiding these three behind-the-scenes malicious domains: dinet.info, frlynx.info, and joutweb.net. When this group of URLs was re-scanned at a later date, these three domains were replaced by tisall.info, frsets.info, and recd-ir.org (hosted on the same pair of IP addresses 85.255.115.227 and 66.230.138.194), while the cloaking behavior remained the same.

Search engines have become such a dominating web portal that many spammers are willing to sacrifice all non-click-through traffic by using click-through cloaking in order to minimize the risk of getting caught and blacklisted. An in-depth analysis of stealth spam pages shows that spammers use referrer-based cloaking to hide spammer-operated redirection domains from spam investigation. Techniques described above have categorized cloaked pages at three levels: at the first level (i), differentiating server-side cloaking, client-side cloaking, and combination techniques; at the second level (ii), distinguishing advanced cloaking, which checks for spam investigation-style queries, from simple cloaking; at the third level (iii), distinguishing obfuscated scripts from plaintext referrer-checking scripts.

An exemplary anti-cloaking scanner can visit websites by clicking through search results in order to defeat all referrer-based cloaking techniques. A redirection diff-based component can turn cloaking behavior into a spam detection mechanism. Through IP subnet-based spam hunting, use of such a component discovered over 10,000 cloaked pages that were hiding hundreds of spam-related redirection domains. Malicious website operators are also using cloaking techniques. The foregoing trials demonstrate how automated exploit detection systems (and human security investigators) can adopt anti-cloaking techniques in their scanning and investigation.

Double Funnel Model

As already discussed with respect to FIG. 1, search spammers use questionable search engine optimization (SEO) techniques to promote their spam links into top search positions. Through analysis of one prevalent type of spam—redirection spam—various exemplary techniques can identify spam pages by the third-party domains that these pages redirect traffic to. Discussed below is an exemplary model, referred to as the double-funnel model (DF model), that include multiple layers. A particular DF model includes five-layers for describing end-to-end redirection spam. Various exemplary techniques are described for analyzing the layers and identifying prominent domains on each layer, for example, using two sets of commerce-related keywords—one targeting spammers and the other targeting advertisers. These techniques and trial findings can be used (i) to strengthen search engine ranking algorithms against spam, (ii) for legitimate website owners to locate and remove spam doorway pages, and (iii) for legitimate advertisers to identify unscrupulous syndicators that serve ads on spam pages.

As an example, consider that the following three doorway URLs appeared among the top-10 LIVE SEARCH® search engine search results for the keywords "cheap ticket":

http://-cheapticket.blogspot.com/
http://sitegtr.com/all/cheap-ticket.html
http://cheap-ticketv.blogspot.com/

All these pages appeared to be spam as they used cloaking, their URLs were posted as comments at numerous open forums, and they redirected traffic to known-spammer redirection domains vip-online-search.info, searchadv.com, and webresourses.info. Ads for orbitz.com, a reputable company, also appeared on all these three spam pages. A search using similar keywords on the GOOGLE® and YAHOO!® search engines revealed another two spam pages, hosted on home-town.aol.com.au and megapage.de, that also displayed orbitz.com ads. If a reputable company is unlikely to buy service directly from spammers, a natural question to ask is: who are the middlemen who indirectly sell spammers' service to sites like orbitz.com?

A "follow the money" approach that monitored HTTP traffic revealed that the ads click-through traffic got funneled into either 64.111.210.206 or the block of IP addresses between 66.230.128.0 and 66.230.191.255 upon clicking the orbitz.com ads on each of the five pages. Moreover, the chain of redirections stopped at http://r.looksmart.com, which then redirected to orbitz.com using HTTP 302.

An end-to-end redirection analysis of spam activities is described herein with an emphasis on syndication-based spam. An exemplary five-layer DF model models displayed ads as flowing in one direction and click-through traffic flowing in another direction. By constructing two different benchmarks of commerce-related search terms and using the SR system to analyze tens of thousands of spam links that appeared in top results across three major search engines, the DF model was able to identify the major domains in each of the five layers as well as associated characteristics.

A discussion of the spam DF model is followed by a discussion of a spammer-targeted search benchmark and an analysis of spam density and DF model for this benchmark. An advertiser-targeted benchmark is discussed and analysis results using this benchmark are compared with those for the spammer-targeted benchmark. While various examples discuss redirection spam, non-redirection spam can also connect to the DF model. As the web is transient in nature, various URLs mentioned herein may change in character or become inactive.

A typical advertising syndication business consists of three layers: (i) the publishers that attract traffic by providing quality content on their websites to achieve high search rankings, (ii) the advertisers that pay for displaying their ads on those websites, and (iii) the syndicators that provide the advertising infrastructure to connect the publishers with the advertisers. The GOOGLE® AdSense program is an example of a syndicator. Although some spammers have abused the AdSense program, the abuse is most likely the exception rather than the norm.

In a questionable advertising business, spammers assume the role of publishers that set up websites of low-quality content and use black-hat search engine optimization (SEO) techniques to attract traffic. To better survive spam detection and blacklisting by search engines, many spammers have split their operations into two layers. At the first layer are the doorway pages, whose URLs the spammers promote into top search positions. When users click those links, their browsers applications are instructed to fetch spam content from redirection domains, which occupy the second layer.

To attract prudent legitimate advertisers that do not want to be too closely connected to the spammers, many syndicators have also split their operations into two or more layers, which are connected by multiple redirections, to obfuscate the connection between the advertisers and the spammers. Since these syndicators are typically smaller companies, they often join forces through traffic aggregation to attract sufficient traffic providers and advertisers.

Figure 9:
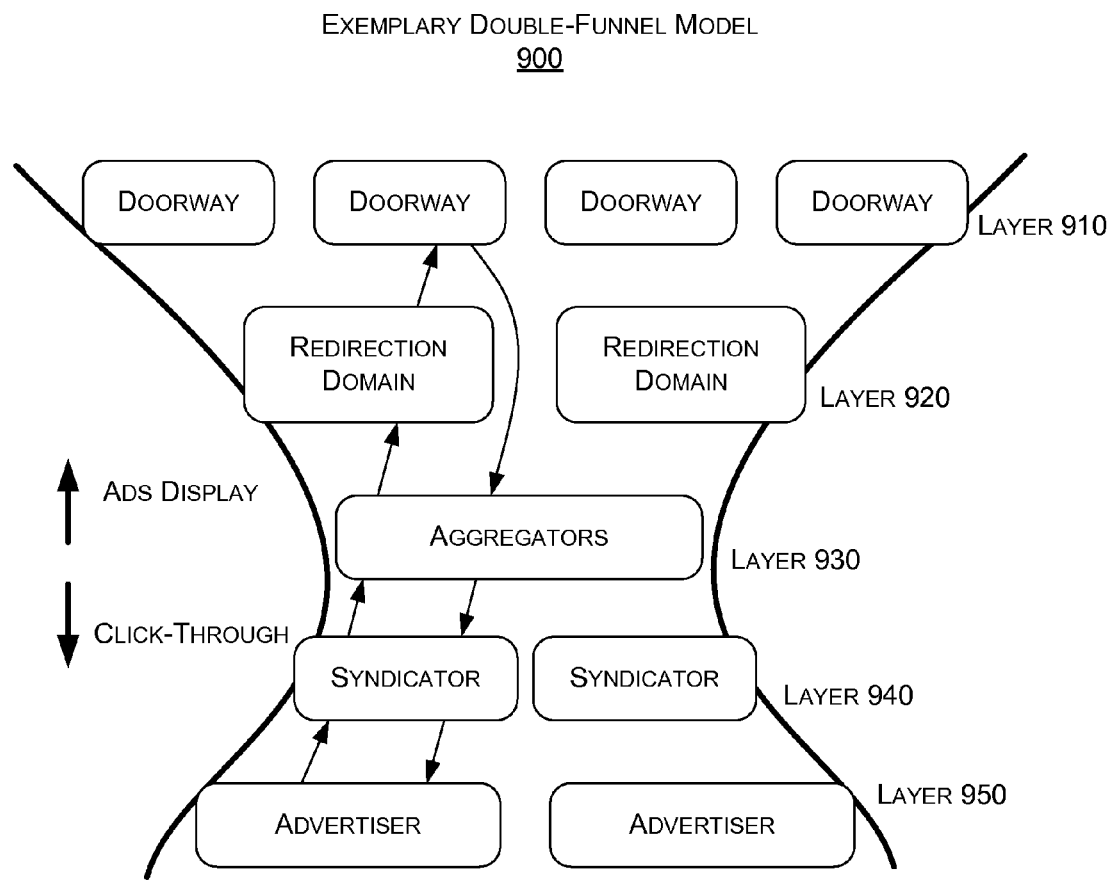
FIG. 9 is a diagram of an exemplary double-funnel model for analyzing spam and for identifying entities involved in spam.

FIG. 9 shows an exemplary five layer DF model 900 that models an end-to-end search spamming business. From bottom to top, the model 900 includes tens of thousands of advertisers (Layer 950) that pay a handful of syndicators (Layer 940) to display their ads. The syndicators buy traffic from a small number of aggregators (Layer 930), who in turn buy traffic from web spammers to insulate syndicators and advertisers from spam pages. The spammers set up hundreds to thousands of redirection domains (Layer 920), create millions of doorway pages (Layer 910) that fetch ads from these redirection domains, and widely spam the URLs of these doorways at public forums. If any such URLs are promoted into top search results and are clicked by users, all click-through traffic is funneled back through the aggregators, who then de-multiplex the traffic to the right syndicators. Sometimes there is a chain of redirections between the aggregators and the syndicators due to multiple layers of traffic affiliate programs, but almost always one domain at the end of each chain is responsible for redirecting to the target advertiser's website.

In the case of AdSense-based spammers, the single domain googlesyndication.com was found to play the role of the middle three layers (920, 930, 940), responsible for serving ads, receiving click-through traffic, and redirecting to advertisers. Specifically, browsers applications were found to fetch AdSense ads from the redirection domain googlesyndication.com and display them on the doorway pages, where ads click-through traffic was directed into the aggregator domain googlesyndication.com before reaching advertisers' websites.

To study the common characteristics of redirection spam, a process was implemented to discover the keywords and categories heavily targeted by redirection spammers. This process was able to derive 10 spammer-targeted categories and a benchmark of 1,000 keywords, which served as the basis for the analyses presented further below.

Redirection spammers often use their targeted keywords as the anchor text of their spam links at public forums, exploiting a typical algorithm by which common search engines index and rank URLs. For example, the anchor text for the spam URL http://coach-handbag-top.blogspot.com/ is typically "coach handbag". Therefore, the process collected spammer-targeted keywords by extracting all the anchor text from a large number of spammed forums and ranking the keywords by their frequencies.

Through a manual investigation of spam reports from multiple sources including search user feedback, heavily spammed forum types, online spam discussion forums, etc., a list of 323 keywords was compiled that returned spam URLs among the top 50 results at one of the three major search engines. Queries for these keywords at all three search engines were performed and the top-50 results were extracted and scanned with a SR system. This analysis identified 4,803 unique redirection spam URLs.

Next, a "link" query was issued on each of the 4,803 URLs, which retrieved 35,878 unique pages that contained at least one of these unique redirection spam URLs. From these pages, a total of 1,132,099 unique keywords were collected, with a total of 6,026,699 occurrences. These keywords were ranked by their occurrence counts. The top-5 keywords are all drugs-related: "phentermine" (8,117), "viagra" (6,438), "cialis" (6,053), "tramadol" (5,788), and "xanax" (5,663). Among the top one hundred, 74 are drugs-related, 16 are ringtone-related, and 10 are gambling-related.

Among the above 1,132,099 keywords, a top list of, for example, the top 1000, could be selected for subsequent analyses. However, it was noted that keywords related to drugs and ringtones dominated the top-1000 list. As it is useful to study spammers that target different categories, a benchmark was constructed manually by selecting ten of the most prominent categories from the list. These categories were selected as follows:

1. Drugs: phentermine, viagra, cialis, tramadol, xanax, etc.
2. Adult: porn, adult dating, sex, etc.
3. Gambling: casino, poker, roulette, texas holdem, etc.
4. Ringtone: verizon ringtones, free polyphonic ringtones, etc.
5. Money: car insurance, debt consolidation, mortgage, etc.
6. Accessories: rolex replica, authentic gucci handbag, etc.
7. Travel: southwest airlines, cheap airfare, hotels las vegas, etc.
8. Cars: bmw, dodge viper, audi monmouth new jersey, etc.
9. Music: free music downloads, music lyrics, 50 cent mp3, etc.
10. Furniture: bedroom furniture, ashley furniture, etc.

To proceed with the analysis, the top-100 keywords were selected from each category to form a first benchmark of 1,000 spammer-targeted search terms.

The 1,000 keywords of the first benchmark were input to a SR system, which retrieved the top-50 results from all three major search engines. In total, the analysis collected 101,585 unique URLs from 1,000×50×3=150,000 search results. With a set of approximately 500 known-spammer redirection domains and AdSense IDs at the time of the analysis, the SR system identified 12,635 unique spam URLs, which accounted for 11.6% of all the top-50 appearances. (The actual redirection-spam density should be higher because some of the doorway pages had been deactivated, which no longer caused URL redirections when scanned.)

With respect to spam density, a comparison was made on per-category spam densities across the 10 spammer-targeted categories. The numbers ranged from 2.7% for Money to 30.8% for Drugs. Two categories, Drugs and Ringtone, were well above twice the average. Three categories—Money, Cars, and Furniture—were well below half the average. The Discounted Cumulated Gain (DCG) was calculated for the spam densities, which give more weights to spam URLs appearing near the top of the search-result list, but found no significant difference from the non-DCG calculation.

An analysis of the five layers of the DF model 900 identified major domains involved at each layer. These were categorized to provide insights into the current trends of search spamming.

Layer 910: Doorways Domains

The top-15 primary domains/hosts by the occurrences of doorway URLs hosted on them were analyzed. The top domain/host was blogspot.com, with 3,882 appearances (of 2,244 unique doorway URLs), which is an order of magnitude higher than the other 14. This translates into a 2.6% spam density by blogspot URLs alone, which is around 22% of all detected spam appearances. By comparison, number 15, blog.hlx.com, has 110 occurrences of 61 unique URLs. Typically, spammers create spam blogs, such as http://PhentermineNoPrescriptionn.blogspot.com, and use these doorway URLs to spam the comment area of other forums. As numbers 2, 3, 4, and 7 of the top-15 all belong to the same company, an alternative exemplary analysis combines their numbers, resulting in 1,403 occurrences (0.9% density) of 948 unique URLs.

The top-15 domains can be divided into four categories: (i) five are free blog/forum hosting sites, (ii) five are free web-hosting sites in English, (iii) three appear to be free web-hosting sites in foreign languages, and (iv) the remaining two (oas.org and usaid.gov) are Universal Redirectors, which take an arbitrary URL as an argument and redirect the browser to that URL. For example, the known-spammer domain paysefeed.net, which appears to be exploiting tens of universal redirectors, was behind the following spam URLs:

--- http://www.oas.org/main/main.asp?slang=s&slink=http://dir.kzn.ru/hydrocodone/; and
http://www.usaid.gov/cgi-bin/goodbye?http://catalog-online.kzn.ru/free/verizon-ringtones/.

---

None of these 15 sites hosts only spam and therefore should not be simply blacklisted by search engines. This analysis confirms the anecdotal evidence that a significant portion of the web spam industry has moved towards setting up "throw-away" doorway pages on legitimate domains, which then redirect to their behind-the-scenes redirection domains.

An exemplary method performs an analysis that selects a certain number of top domains/hosts (e.g., 15 domains/hosts). Such an analysis can be used by one or more search engines to identify spam-heavy sites and to scrutinize their URLs.

An analysis of the aforementioned top-15 domains showed that 14 of the top-15 doorway domains have a spam percentage higher than 74%; that is, 3 out of 4 unique URLs on these domains (that appeared in the search results) were detected as spam. To demonstrate reasons for scrutinizing these sites, a scan of the top-1000 results was performed from two queries—"site:blogspot.com phentermine" and "site:hometown.aol.com ringtone". This scan identified more than half of the URLs as spam. It is in the interest of the owners of these legitimate websites to clean the heavy spam on their sites to avoid the reputation of spam magnets; noting that not all large, well-established web hosting sites are heavily abused by spammers. For example, data indicate that each of tripod.com (number 19), geocities.com (number 32), and angelfire.com (number 38) had fewer spam appearances than some newer, smaller web sites that rank among the aforementioned top 15.

When a site within a non-commercial top-level domain, such as .gov and .edu, occurs prominently in the search results of spammer-targeted commerce-related search terms, it often indicates that the site has been spammed. The top 15 .gov/.edu domains that host the largest number of spam URLs were identified and divided into three categories:

---

(i) Universal redirectors: for example, these two spam URLs
http://serifos.eecs.harvard.edu/proxy/http://catalog-online.kzn.ru/christian-ringtones/ and
http://www.fmcsa.dot.gov/redirect.asp?page=http://maxpages.com/troctrobas
both redirect to paysefeed.net.
(ii) Unprotected upload areas, such as
http://uenics.evansville.edu:8888/school/uploads/1/buy-carisoprodol-cheap.html and
http://xdesign.ucsd.edu/twiki/bin/view/main/tramadolonline.
(iii) Home page-like directories, such as
http://aquatica.mit.edu/albums/gtin/texas-country-ringtones.html and
http://find.uchicago.edu/~loh/albums/cial.php?id=56.

---

Owners of the two domains nudai.com and raph.us appeared to be targeting .edu domains and were behind spam URLs hosted on 8 of the 15 domains. Another two ubiquitous spammers, paysefeed.net and topmeds10.com, covered six of the remaining seven domains.

Layer 920: Redirection Domains

An analysis ranked the top-15 redirection domains by the number of spam doorway URLs that redirected to them. Twelve of them were syndication-based, serving text-based ads-portal pages containing 5 to 20 ads each, two of them displayed pornographic ads, and the remaining one was a merchant website. Domains ranked 1, 2, 3, 5, and 10 all resided on the same IP block between 209.8.25.150 and 209.8.25.159, collectively responsible for serving ads on 3,909 spam appearances (or 2.6% spam density and 22% of all detected spam appearances). Furthermore, topsearch10.com and searchadv.com shared the same registrant, and topmeds10.com and topmobile10.com shared the same proxy registrant. In addition, paysefeed.net and arearate.com shared the same registrant, while vip-online-search.info and webresourses.info shared the same IP address 195.225.177.32. In summary, a few major spammer groups appeared to own multiple top redirection domains.

None of the AdSense spammers appeared in the top-15 list. The highest-ranking AdSense spammer was ca-pub-4084532739617626 (number 45), with 112 spam appearances of randomly named, made-for-ads .info domain pages, such as http://583.8d1w.info and http://101.j5bpqexcfs.info.

Layers 930, 940 and 950

An analysis focused on redirection spam pages that are ads portals. Among the 12,635 unique spam URLs, 5,172 ads-portal pages were extracted that contained a total of 72,239 ads. Two types of analyses were performed. For layers 930 and 950, page analysis was performed by extracting target advertiser URLs as well as their associated click-through URLs from ads-portal pages, without visiting all the ads. For layer 940, click-through analysis was performed by randomly selecting and visiting one ad from each portal page and recording all resulting redirection traffic. This was deemed necessary because the domain names of intermediate syndicators did not appear in the content of ads-portal pages.

Layer 930: Aggregators (Page Analysis)

The top-15 click-through traffic receiver domains were identified based on an analysis of static ads appearances on spam pages. All of the top-15 were in the form of IP addresses that could be divided into two groups: 13 of the IP addresses belong to the block between 66.230.128.0 and 66.230.191.255, which will be referred to as "the 66.230 IP block" throughout the paper, while the remaining two (number 1 and number 12) belonged to the block between 64.111.192.0 and 64.111.223.255, referred to as "the 64.111 IP block"; noting that the two IP blocks actually share the same network Whois record.

In total, the analysis collected 51,392 and 8,186 ads appearances for the 66.230 block and the 64.111 block, respectively. Furthermore, even for some of the ads with non-IP domain names, such as it-psp.com (number 18) and abosearch.com (number 19), their click-through traffic eventually still got funneled into the above two IP blocks. Results from the analysis indicate that a more comprehensive click-through analysis of all the ads would find even more ads-portal pages sending click-through traffic to these two IP blocks.

Layer 950: Advertisers (Page Analysis)

On most spam ads, click-through URLs did not contain the plaintext URLs of their target advertisers. But the advertisers' domain names were often displayed either as anchor text or in the status bar, for example, upon a cursor-over placement. By extracting such domain names from the ads-portal pages and ranking them based on the number of their appearances, the top-15 advertisers for the 10 categories studied were identified. Of these top-15 advertisers, 10 were ringtone-related, two belonged to the drugs category, one belonged to the money category, and the remaining two were cross-category. Well-known names that appeared on the complete list included: shopping.com (number 22, 492 appearances), dealtime.com (number 25, 465 appearances), bizrate.com (number 33, 305 appearances), orbitz.com (number 44, 258 appearances), ebay.com (number 52, 225 appearances), and shopzilla.com (number 54, 221 appearances).

Layer 940: Syndicators (Click-Through Analysis)

In a click-through analysis, a handful of syndicator domains had significant presence in the redirection chains. They appeared to be the major middlemen between spam-traffic aggregators and the advertisers. In particular, the top-3 syndicators: findwhat.com, looksmart.com, and 7search.com appeared on 1,656,803, and 606 redirection chains, respectively. Together the top-3 accounted for 3,065 (59%) of the 5,172 redirection chains.

Advertiser-Targeted Keywords

While the above-analysis pertains to the five layers of the exemplary DF model 900 for end-to-end search spam based on the most spammed keywords at public forums, a primary concern of most search users and legitimate advertisers is the impact of such spam on the quality of their query results. For example, they may not care if large amount of spam targets search terms outside their interest, such as online drug purchases. Accordingly, an analysis was performed using a different benchmark; a benchmark based on the most-bid keywords from legitimate advertisers.

Benchmark of 1,000 Most-Spammed Advertiser-Targeted Keywords

For this second benchmark, a list of 5,000 most-bid keywords was (i) obtained from a legitimate ads syndication program, (ii) queried at all three major search engines to retrieve the top-50 results, (iii) resulting URLs scanned and analyzed (e.g., using a SR system), and (iv) 1,000 keywords selected with the highest per-keyword spam densities. Compared to the aforementioned spammer-targeted benchmark, the second benchmark had fewer keywords from the drugs, adult, and gambling categories, and more keywords from the money category and other miscellaneous categories; noting that the two benchmarks overlapped by about 15%.

Spam Density Analysis

A scan of 95,753 unique URLs resulted in 6,153 of these being identified as spam, which accounted for 5.8% of all top-50 appearances. This number is lower than the 11.6% number for the first benchmark, and there are two partial explanations. First, the second benchmark has fewer keywords from the heavily spammed categories; and second, the second benchmark was measured two weeks after the first one, while one of the three major search engines started to remove spam URLs right after the first measurement.

Double-Funnel Analysis

The five layers of the DF model for the second benchmark were compared to the results from the first benchmark.

Layer 910: Doorway Domains

Similar to the first benchmark analysis, blogspot.com remained the number doorway domain with an-order-of-magnitude higher spam appearances than the other domains that accounted for 29% of all detected spam appearances and had a spam percentage as high as 75%. Again, all but one of the top-15 domains (uconn.edu in this case) had a higher than 74% spam percentages. The most notable differences from the first benchmark were for four info domains, all of which appeared to have been set up solely for hosting doorway pages. In fact, 1,224 of the 1,798 unique info URLs were identified as spam, and they had 1,324 appearances, 15% of all detected spam. The analysis showed that info had a 68% spam percentage in the search results, which is an-order-of-magnitude higher than that for .com (4.1%). For comparison, the two numbers were 63% and 9.6% for the spammer-targeted benchmark.

Layer 920: Redirection Domains

The top-15 redirection domains were syndication-based. Seven of them overlapped with those from the first benchmark analysis. In the top-15, topsearch10.com stood out as the only redirection domain that was behind over 1,000 spam appearances in both benchmarks. In addition, redirection domains residing in the 209.8.25.150 to 209.8.25.159 IP block continued to have a significant presence with 2,208 doorway appearances, which accounted for 25% of all spam appearances. The most notable differences were that drugs and adult spammers were replaced by money spammers, reflecting the different compositions of the two benchmarks. Finally, veryfastsearch.com (64.111.196.122) and nudai.com (64.111.199.189) belonged to the 64.111 IP block described above, and could potentially connect to the aggregator more directly. Again, none of the AdSense spammers appeared in the top-15 list. The highest-ranking one was ca-pub-2706172671153345, that ranked number 31 with 61 spam appearances of 27 unique spam blogs at blogspot.com.

Layers 930, 940 and 950

Among the 6,153 unique spam URLs, 2,995 ads-portal pages were extracted that contained a total of 37,962 ads.

Layer 930: Aggregators (Page Analysis)

As in the first benchmark analysis, the 66.230 and 64.111 IP blocks contained dominating receiver domains for spam-ads click-through traffic. In total, 28,938 and 6,041 ads were collected for these two IP blocks, respectively.

Layer 950: Advertisers (Page Analysis)

The top-15 advertisers were significantly different from the ones in the first benchmark analysis; only six overlapped. Well-known sites—such as bizrate.com, shopping.com, dealtime.com, and shopzilla.com, which previously ranked between numbers 20 and 60—now move into the top 15. This reflects the fact that advertiser-targeted keywords better match these shopping websites than spammer-targeted keywords.

Layer 940: Syndicators (Click-Through Analysis)

The exemplary click-through analysis showed that the two benchmarks shared the same list of top-3 syndicators, despite the fact that the benchmarks had only 15% overlap in the list of keywords and very different top-advertisers list. Again, the top-3 syndicators appeared on a large number of redirection chains in the analysis: looksmart.com (881), findwhat.com (809), and 7search.com (335), which together accounted for 2,025 (68%) of the 2,995 chains. These numbers demonstrate that these syndicators appear to be involved in the search spam industry both broadly and deeply.

Other Common Spam

Many syndication-based spammers that do not use client-side browser redirections to fetch ads share the same bottom half of the double-funnel with redirection spammers; that is, although they fetch ads on the server side, they also funnel the click-through traffic from their pages into the same IP blocks that were uncovered in the aforementioned benchmark analyses. Thus, the aggregators and the syndicators involved are profiting from even more spam traffic.

Blog Farms

The web page at http://urch.ogymy.info/ is a commonly seen made-for-ads blog page that consists of three parts: a list of ads, followed by a few programmatically generated short comments, followed by a long list of meaningless paragraphs designed to promote several randomly named .org and .info URLs sprinkled throughout the paragraphs. By issuing the following queries—"Welcome to my blog" "Hello, thanx for tips" phentermine domain:info, as well as "linkdomain:ogymy.info" and "linkfromdomain:ogymy.info"—an analysis found that 1,705 unique pages shared the same format and belonged to the same blog farm. By visiting each page and analyzing the ads URLs, all 17,050 ads forwarded click-through traffic to 64.111.196.117, which was number 12 in layer 930 of the first benchmark analysis and number 7 in layer 930 of the second benchmark analysis.

Parasite Ads-Portal Farms

The web pages at

> http://phentermine.IEEEpcs.org/,
> http://www.HistMed.org/Gambling-Online.phtml, and
> http://ChildrensMuseumOfOakridge.org/PornStar-Finder.dhtml are three examples of commonly seen made-for-ads pages that attach themselves to legitimate domains to increase their search ranking and to resist blacklisting. By searching for other farms with similar signatures, an analysis discovered 91 .org domains that were infected with such "parasites": 10 had been removed, 3 appeared as "Under Construction", and the rest were actively serving ads. By visiting 10 pages on each of the active farms, 15,580 ads were extracted and it was found that 6,200 of them were funneling click-through traffic to 64.111.210.10, 64.111.210.206, and 64.111.214.154 (see number 1 in the list of layer 930 of the first benchmark analysis), all of which belong to the 64.111 IP block. The remaining 9,380 ads belonged to 66.230.138.243 and 66.230.138.211, number 2 and number 4 in layer 930 of the first benchmark analysis, respectively. A few of the .org domains used click-through cloaking; for example, http://www.urbanacademy.org/pc-fix-it.phtml returned "HTTP 404 Not Found" when visited directly, but displayed a page of ads when visited through a search-result click-through.

As discussed herein, an exemplary search monkey(s) component is able to foil cloaking, including newer click-through cloaking techniques, by mimicking search users' behavior using a full-fledged browser application so that redirection analyses are performed on true pages displayed to the users. As already mentioned, money is a major incentive for spammers. Various exemplary techniques can focus on detecting large-scale spammers by following the money to track down major domains that appear in the redirection chains involving spam ads. Various exemplary techniques use link analyses to identify spammed forums and rely on redirection analysis to identify spam pages; noting that content analysis can also useful for detecting spam. An exemplary method or system may use traffic-based analysis complementary to content-based analyses.

The exemplary five-layer double-funnel model 900 of FIG. 9 is suitable for analyzing redirection spam, in which ads from merchant advertisers are funneled through a number of syndicators, aggregators, and redirection domains to get displayed on spam doorway pages, whereas click-through traffic from these spam ads is funneled, in the reverse direction, through the aggregators and syndicators to reach the advertisers. Domains in the middle layers provide critical infrastructure for converting spam traffic to money, but they have mostly been hiding behind the scenes. As described herein, systematic and quantitative traffic-analysis techniques can be used to identify the major players and to reveal their broad and deep involvement in the end-to-end spam activities. For example, for a layer of doorway domains, two analyses showed that the free blog-hosting site blogspot.com had an-order-of-magnitude higher spam appearances in top search results than other hosting domains in both benchmarks, and was responsible for about one in every four spam appearances (22% and 29% in the two benchmarks respectively). In addition, at least three in every four unique blogspot URLs that appeared in top-50 results for commerce queries were spam (77% and 75%). Analyses showed that over 60% of unique .info URLs in search results were spam, which was an-order-of-magnitude higher than the spam percentage number for .com URLs.

For a second layer of redirection domains, analyses showed that the spammer domain topsearch10.com was behind over 1,000 spam appearances in both benchmarks, and the 209.8.25.150 to 209.8.25.159 IP block where it resided hosted multiple major redirection domains that collectively were responsible for about 22% to about 25% of all spam appearances. The majority of the top redirection domains were syndication-based, serving text-based ads-portal pages.

For a third layer of aggregators, analyses found that two IP blocks 66.230.128.0 to 66.230.191.255 and 64.111.192.0 to 64.111.223.255 appeared to be responsible for funneling an overwhelmingly large percentage of spam-ads click-through traffic. As mentioned above, over 100,000 spam ads associated with these two IP blocks were collected, including many ads served by non-redirection spammers as well. These two IP blocks occupy the "bottleneck" of the spam double-funnel and may prove to be the best layer for attacking the search spam problem.

For a fourth layer of syndicators, analyses indicated that a handful of ads syndicators appeared to serve as middlemen for connecting advertisers with the majority of the spammers. In particular, the top-3 syndicators were involved in about 59% to about 68% of the spam-ads click-through redirection chains sampled. By serving ads on a large number of low-quality spam pages at potentially lower prices, these syndicators could become major competitors to main-stream advertising companies that serve some of the same advertisers' ads on search-result pages and other high-quality, non-spam pages.

For a fifth layer of advertisers, analyses showed that even well-known websites' ads had significance presence on spam pages. Ultimately, it is advertisers' money that is funding the search spam industry, which is increasingly cluttering the web with low-quality content and reducing web users' productivity. By exposing the end-to-end search spamming activities, an exemplary DF model analysis can help to educate users not to click spam links and spam ads, and to encourage advertisers to scrutinize those syndicators and traffic affiliates that are profiting from spam traffic at the expense of the long-term health of the web.

Figure 10:
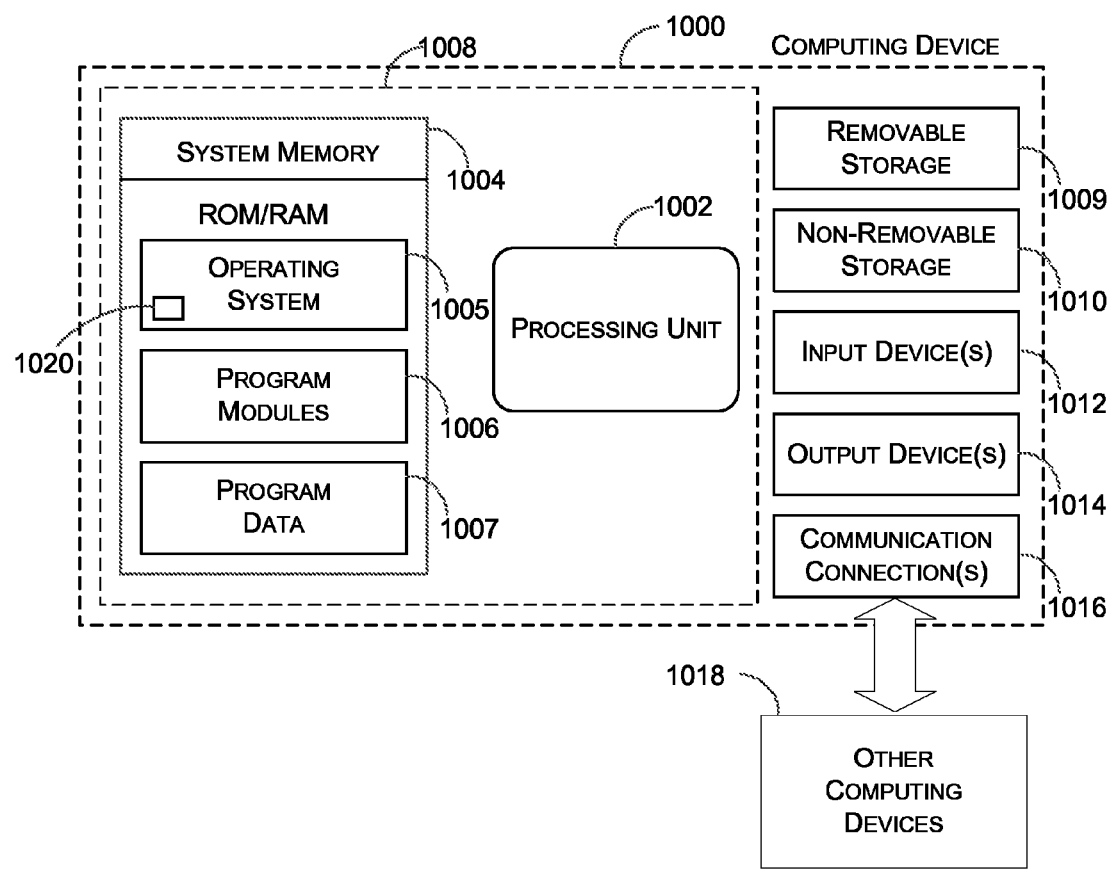
FIG. 10 is a diagram of various components of an exemplary computing device that may be used to implement various exemplary methods discussed herein.

FIG. 10 shows various components of an exemplary computing device 1000 that may be used to implement part or all of various exemplary methods discussed herein (see, e.g., the client device 210 and the server 250 of FIG. 2).

The computing device 1000 shown in FIG. 10 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 10, one exemplary system for implementing an exemplary SR system includes a computing device or uses a computing device, such as computing device 1000. In a very basic configuration, computing device 1000 typically includes at least one processing unit 1002 and system memory 1004. Depending on the exact configuration and type of computing device, system memory 1004 may be volatile (such as RAM), non-volatile (such as ROM, flash memory, etc.) or some combination of the two. System memory 1004 typically includes an operating system 1005, one or more program modules 1006, and may include program data 1007. This basic configuration is illustrated in FIG. 10 by those components within dashed line 1008.

The operating system 1005 may include a component-based framework 1020 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of device 1000. Computing device 1000 may also have input device(s) 1012 such as keyboard, mouse, pen, voice input device, touch input device, etc. Output device(s) 1014 such as a display, speakers, printer, etc. may also be included. These devices are well know in the art and need not be discussed at length here.

Computing device 1000 may also contain communication connections 1016 that allow the device to communicate with other computing devices 1018, such as over a network. Communication connection(s) 1016 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods and systems disclosed herein without departing from their practical scope.

The invention claimed is:

1. A method comprising:
providing a multi-layer model that comprises:
an advertiser layer associated with advertisers that compensate syndicators to display advertisements;
a syndicator layer associated with the syndicators that buy click traffic from aggregators for the advertisements;
an aggregation layer associated with the aggregators that buy the click traffic from spammers to insulate the syndicators and the advertisers from being associated with spam content;
a redirection layer associated with redirection domains used by the spammers to fetch the spam content after a doorway web page is clicked; and
a doorway layer associated with doorway web pages that the spammers promote to top search result positions to attract the click traffic;
identifying, based on an analysis of the multi-layer model, the aggregation layer as a bottleneck layer that uses at least one Internet Protocol (IP) block to funnel the advertisements and to associate the advertisements with the spam content; and
performing, by one or more processors configured with executable instructions, one or more corrective actions that act on the bottleneck layer to protect web browsers from search spam.

2. The method of claim 1, wherein the one or more corrective actions act on information associated with the bottleneck layer.

3. The method of claim 1, wherein the one or more corrective actions act on a block of IP addresses.

4. The method of claim 1, wherein the multi-layer model models redirection spam.

5. The method of claim 1, wherein the identifying the aggregation layer comprises using search keywords.

6. The method of claim 5, wherein the search keywords comprise commercial keywords.

7. The method of claim 5, wherein the search keywords comprise a set that targets the spammers.

8. The method of claim 5, wherein the search keywords comprise a set that targets the advertisers.

9. The method of claim 1, wherein the one or more corrective actions act on a search engine to protect web browsers from the search spam.

10. The method of claim 9, wherein the one or more corrective actions act on a ranking algorithm of the search engine.

11. The method of claim 1, wherein the one or more corrective actions comprise locating a spam doorway page.

12. A method comprising:
providing a multi-layer spam model that includes:
- an advertiser layer associated with an advertising entity that compensates a syndicator to display one or more advertisements;
- a syndicator layer associated with the syndicator that buys click-through traffic from an aggregator for the one or more advertisements;
- an aggregation layer associated with the aggregator that buys the click-through traffic from one or more spammers to insulate the syndicator and the advertising entity from being associated with spam content;
- a redirection layer associated with one or more redirection domains used by the one or more spammers to fetch the spam content after a doorway web page is clicked; and
- a doorway layer associated with the doorway web page that the one or more spammers promote to top search result positions to attract the click-through traffic;

identifying at least one of the syndicator layer, the aggregation layer or the redirection layer as an intermediate layer in the multi-layer spam model that is used to convert the click-through traffic associated with the spam content into money;

identifying a block of Internet Protocol (IP) addresses in the intermediate layer that funnels the one or more advertisements from the advertiser layer to the doorway web page from the doorway layer; and performing, by one or more processors configured with executable instructions, one or more corrective actions on the block of IP addresses.

13. The method of claim 12, wherein the one or more corrective actions protect web browsers from search spam.

14. The method of claim 13, wherein the one or more corrective actions act on a search engine to protect the web browsers from the search spam.

15. The method of claim 14, wherein the one or more corrective actions act on a search result ranking algorithm of the search engine.

16. The method of claim 12, further comprising comparing an IP address in the block of IP addresses to a previously identified IP address.

17. The method of claim 12, further comprising periodically repeating the method to monitor spam.

18. One or more computer memories storing instructions that, when executed by a computing device, instruct the computing device to perform actions comprising:
providing a multi-layer model including:
- an advertiser layer associated with an advertising entity that compensates a syndicator to display one or more advertisements;
- a syndicator layer associated with the syndicator that buys click-through traffic from an aggregator for the one or more advertisements;
- an aggregation layer associated with the aggregator that buys the click-through traffic from one or more spammers to insulate the syndicator and the advertising entity from being associated with spam content;
- a redirection layer associated with one or more redirection domains used by the one or more spammers to fetch the spam content after a doorway web page is clicked; and
- a doorway layer associated with the doorway web page that the one or more spammers promote to top search result positions to attract the click-through traffic;

identifying at least one of the syndicator layer, the aggregation layer or the redirection layer as an intermediate layer in the multi-layer model that is used to convert the click-through traffic associated with the doorway web page into value;

identifying at least one Internet Protocol (IP) block associated with the intermediate layer, the at least one IP block configured to funnel the one or more advertisements as advertising spam to the click-through traffic associated with the doorway web page; and taking one or more corrective actions on the at least one IP block to protect web browsers from the advertising spam.

* * * * *